United States Patent [19]
Goto et al.

[11] Patent Number: 6,030,745
[45] Date of Patent: *Feb. 29, 2000

[54] OPTICAL RECORDING PROCESS

[75] Inventors: Hironori Goto; Hideo Kobayashi, both of Kanagawa, Japan

[73] Assignee: Fuji Xerox Co., Ltd., Tokyo, Japan

[*] Notice: This patent is subject to a terminal disclaimer.

[21] Appl. No.: 09/177,368

[22] Filed: Oct. 23, 1998

Related U.S. Application Data

[60] Continuation of application No. 08/450,571, May 25, 1995, Pat. No. 5,914,212, which is a division of application No. 07/545,941, Jun. 29, 1990, abandoned.

[30] Foreign Application Priority Data

Jun. 30, 1989 [JP] Japan ..................... 1-166804

[51] Int. Cl.$^7$ ........................................ G11B 7/00
[52] U.S. Cl. .................. 430/269; 430/19; 430/270.12; 430/270.13; 430/945; 369/13; 369/15
[58] Field of Search ................ 430/270.12, 270.13, 430/945, 269, 19, 944; 428/64.4, 64.5; 369/13, 15

[56] References Cited

U.S. PATENT DOCUMENTS

| | | | |
|---|---|---|---|
| 4,576,895 | 3/1986 | Baston et al. | 430/270.12 |
| 4,653,024 | 3/1987 | Young et al. | 365/113 |
| 4,719,594 | 1/1988 | Young et al. | 430/270.13 |
| 4,777,492 | 10/1988 | Ohnishi et al. | 346/1.1 |
| 4,835,048 | 5/1989 | Maeda et al. | 428/323 |
| 4,860,273 | 8/1989 | Sawano et al. | 369/100 |
| 4,947,372 | 8/1990 | Koshino et al. | 365/106 |
| 5,514,440 | 5/1996 | Gotoh et al. | 430/495.1 |

OTHER PUBLICATIONS

Abstract of JP60–180887, "Recording Material", Yuka et al. (Sep./1985).

*Primary Examiner*—John A. McPherson
*Attorney, Agent, or Firm*—Finnegan, Henderson, Farabow, Garrett & Dunner, L.L.P.

[57] ABSTRACT

An optical recording medium comprising: a substrate having pre-groove for forcing and tracking servo operation; and a recording film formed on the substrate, the recording film having optical properties being changed by applying at least one of a light beam a heating onto a portion of the recording film.

6 Claims, 27 Drawing Sheets

OPTICAL RECORDING PROCESS

This is a continuation of application Ser. No. 08/450,571, filed May 25, 1995, now U.S. Pat. No. 5,914,212, which is a divisional of Ser, No. 07/545,941, filed Jun. 29, 1990, now abandoned.

BACKGROUND OF THE INVENTION

The present invention relates to an optical recording process which provides on a substrate a recording film having such optical properties as are variable by means of light, heat, and so forth and performs the recording, reproduction, and erasure of information through its utilization of changes in the said optical properties and more particularly to improvements on such an optical recording process which is capable of maintaining the recorded information over a long period of time.

The principal parts of the optical recording medium used for this type of optical recording process are comprised, for example, of (a) a pre-groove for use in focusing and in tracking servo operation as shown in FIG. 49, (b) a light-transmissive substrate in which the said pre-groove (a) is formed, (c) a recording film formed uniformly over the surface of this substrate (b), and (d) a protective film formed uniformly over the surface of this recording film (c), and the optical recording process performs the reproduction of the information recorded on the said medium by irradiating the convergent beam of light (f) from the light source, such as a semiconductor laser unit, onto the recording film (c) of this optical recording medium and having the reflected light thereof input into a light-receiving element (not illustrated in the Figure), such as a photodiode.

In this regard, the conventional optical recording process are available in two types, namely, the recording and reproducing type of the process, which is not capable of performing the rewriting of the recorded information, and the recording, reproducing and erasing type of the process, which is capable of performing the rewriting of the recorded information, and the known processes of the former type, i.e. the recording and reproducing type, are the "ablative process" and the "bubble process".

This is to say, the "ablative process" just mentioned is a process whereby a laser beam or the like is irradiated onto the surface of the recording film (c) on the optical recording medium mentioned above, as shown in FIG. 50, so that the recording film (c) in the irradiated area is thereby caused to have a dissolution resulting in the exposure of the surface of the substrate (b). Thus, this process performs the recording and reproduction of information through its utilization of the difference between the reflection factor of the opened area (g) and that of the unopened area. On the other hand, the "bubble process" is a process which irradiates a laser beam, as shown in FIG. 51, and heats some part of the substrate (b), thereby forming bubbles (h) in the irradiated area by using the pressure of the gas generated from the substrate (b). Thus, this process performs the recording and reproduction of information through utilization of the difference between the reflection factor of the area where the bubbles are formed and that of the area where such bubbles are not formed.

On the other hand, the process of the latter type, namely, the recording, reproducing and erasing type, which is capable of rewriting the recorded information, is a process which reversibly changes the optical properties of the above-mentioned recording film (c) by such means as light and heat, as shown in FIG. 52, and performs the recording, reproduction, and erasure of information through its utilization of the said changes in the optical properties of the recording film. The known processes realized in concrete form are the "phase changing process" and the "magneto-optical process".

In specific terms, the "phase changing process" consists in irradiating a high output laser spot onto a part of the recording film (c) in the crystalline state (cr) as shown in FIG. 53 and thereby transforms the irradiated area from its crystalline state (cr) into its amorphous state (am) through its application of a high speed high temperature heating treatment and a high speed quenching treatment to the irradiated area, and performs the recording and reproduction of information through its utilization of the difference in the reflection factor between the area in the crystalline state (cr) and the area in the amorphous state (am) (See FIG. 54). In the meanwhile, this process performs the erasure of recorded information by irradiating a laser spot beam at a low output onto the recorded area of the recording film (c) mentioned above, as shown in FIG. 55, thus applying a heating treatment at a low temperature and a cooling treatment at a relatively slow pace, thereby transforming the irradiated area from its amorphous state (am) into its crystalline state (cr), i.e. the state of the recording film prior to recording.

On the other hand, the "magneto-optical process" irradiates a laser spot beam onto the recording film (c) composed of magnetic material while it is in the state where a magnetic field is applied in the direction indicated by the arrow mark, as shown in FIG. 56, and, using a change in the Kerr rotating angle (Refer to FIG. 57) as effected by changing the said angle by reversing the direction of magnetization in the irradiated area, this process performs the recording and reproduction of information, and, in the meanwhile, this process performs the erasure of recorded information by irradiating a laser spot beam to a recorded area of the recording film (c) in the state where the direction of the magnetic field is reversed from that at work at the time of recording, as shown in FIG. 58, thereby putting the direction of magnetization in the irradiated area back to the state of the said area prior to recording.

However, these existing optical recording processes present such problems as those mentioned below.

First, the "ablative process" and the "bubble process" of the recording and reproducing type have the problem that the shapes of the openings and those of the bubbles formed on the recording film, as well as the recording film itself, are liable to their change along with the passage of time, thus lacking in the stability for the maintenance of recorded information and also that it is not possible for the processes to rewrite the recorded information.

On the other hand, the "phase changing process" of the recording, reproducing, and erasing type has the problem that it lacks in the stability for the maintenance of the recorded information, just as is the case with the "ablative process" and so forth mentioned above, since the amorphous region, which is in a semi-stable state, tends to be crystallized with the elapse of time because the crystalline region and the amorphous region, which are different from each other in terms of their energy levels, are present side by side on the recording film after the completion of recording of information thereon by the process which, as described above, performs the recording, reproduction, and erasure of information through its utilization of the changes in optical properties attending the phase change between the crystalline state and the amorphous state.

Moreover, the "magneto-optical process" of the recording, reproducing, and erasing type, which is a process for reproducing the recorded information by detection of the Kerr rotating angle as described above, also harbors the problem that is lacks in the stability for the maintenance of recorded signals because such readily oxidized materials as Tb and Fe contained in the recording film are oxidized along with the passage of time.

SUMMARY OF THE INVENTION

In view of the above problems of the prior art, it is an object of this invention to provide an optical recording process which is capable of maintaining recorded information over a long period of time.

That is to say, according to the present invention, an optical recording process provides on a substrate a recording film having such optical properties as are variable by means of light, heat, and so forth and performs the recording and reproduction of information or the recording, reproduction, and erasure of information through its utilization of changes in the said optical properties.

Thus, the optical recording process is characterized by achieving a selective phase separation of the said recording film by such means as light and heat, thereby changing the optical properties in the said region of the film.

In the meanwhile, the recording process of the present invention is characterized by the formation of the above-mentioned recording film with recording material wherein the miscibility gap line appears in the liquid phase region as observed in the phase diagram and also by rewriting the information by means of one beam, which is a single record-erasing beam yielding selectively variable output onto the surface of the recording film mentioned above.

Moreover, the recording process of the present invention is characterized by providing a heat interfering layer having heat radiating effect in the area adjacent to the recording film mentioned above and by causing the occurrence of a phase separation attending a spinodal decomposition by applying a high temperature heating treatment and a quenching treatment to the said recording film.

BRIEF DESCRIPTION OF THE DRAWINGS

The manner by which the above objects and other objects, features and advantages of the present invention are attained will be fully evident from the following detailed description when it is considered in light of the accompanying drawings, wherein:

FIG. 1 is a schematic sectional view of the optical recording medium used in the first example of preferred embodiments of the present invention;

FIG. 2 is a quasi binary phase diagram for the material which constitutes the recording film;

FIG. 3 through FIG. 5 respectively illustrate approximate sectional views of the optical recording media used in the second through forth examples of preferred embodiments of the present invention;

FIG. 6 is a graph showing the relationship between the free energy difference ($\Delta G$) and the molar fraction ($\chi$) in the binary alloy system composed of A and B.

FIG. 7 is a graph showing the binodal decomposition region and the spinodal decomposition region;

DETAILED DESCRIPTION OF THE PREFERRED EMBODIMENTS

The term, "phase separation", as used hereinabove is a thermodynamically explainable characteristic phenomenon which occurs in common to a group of materials composed of a plurality of constituents, including inorganic and organic compounds, regardless of the differences in their structure, and denotes the phenomenon whereby the initial phase of the materials in the group mentioned above separates into two phases mutually different in composition by the effect of thermal processes suitable for the respective conditions. As regards the forms of such phase separation, there are two forms, one being a binodal decomposition, in which the decomposition is accomplished through process which can be regarded as a thermodynamically balanced process (which, in specific terms, is a process consisting of heating and gradual cooling), and the other being a spinodal decomposition which is attained through a thermodynamically imbalanced process (which specifically is a process consisting of heating and quenching), and, in addition, there is a micro phase separation, which occurs typically in such organic compounds as copolymers. Moreover, the phase separation described above is a phenomenon clearly distinguishable from the thermodynamic viewpoint from such phenomena as segregation, peritectogenesis and eutectogenesis as known in the field of metallurgy, and, with reference to the phase diagram, it is a phenomenon which appears typically in such diagrams as those called miscibility gap or solubility gap, which does not include any invariant reaction.

Now, the materials which compose the recording film according to the present invention are those materials which have properties subject to the occurrence of a binodal decomposition or a spinodal decomposition by such means as light and heat—for example, such inorganic compounds as alloys, oxides, halogenides, and non-stoichiometric compounds, blends of polymers, which can be regarded as matters composed of two constituents, such organic compounds commonly called "polymer alloys", and those materials which have properties subject to the occurrence of a micro phase separation by such means as light and heat—for example, such random copolymers, alternate copolymers, block copolymers, graft copolymers, stoichiometric high molecular compounds, and so forth.

At this point, a detailed description is made of the "binodal decomposition" and the "spinodal decomposition" mentioned above, with reference to the accompanying drawings.

Figure 6:
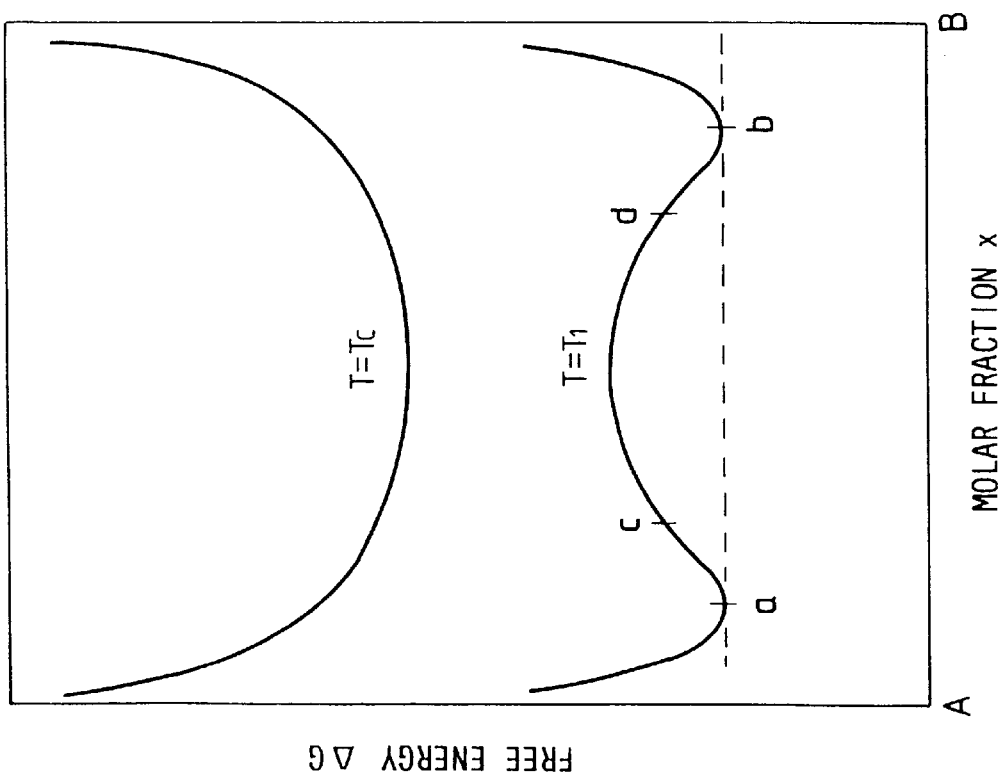

First, FIG. 6 presents a graph showing the variation in the difference of free energy ($\Delta G$) to $\chi$ in the homogeneous mixture system and the heterogeneous mixture system of a mixture consisting of two constituents, i.e., the constituent A in the ratio of [$\chi$ molar %] and the constituent B in the ratio of [$(1-\chi)$ molar %] in their mixture, as observed at the temperature $T_c$ and $T_1$.

In this graph, the curve for $\Delta G-\chi$ at the temperature $T_c$ indicates that the A-B system will be more stable when it is present as a homogeneous mixture in the entire region of composition, and the $\Delta G-\chi$ curve at the temperature $T_1$ the system, in terms of the composition of a and b, will be more stable when it is present in the form of a heterogeneous mixture composed of a and b.

Figure 7:
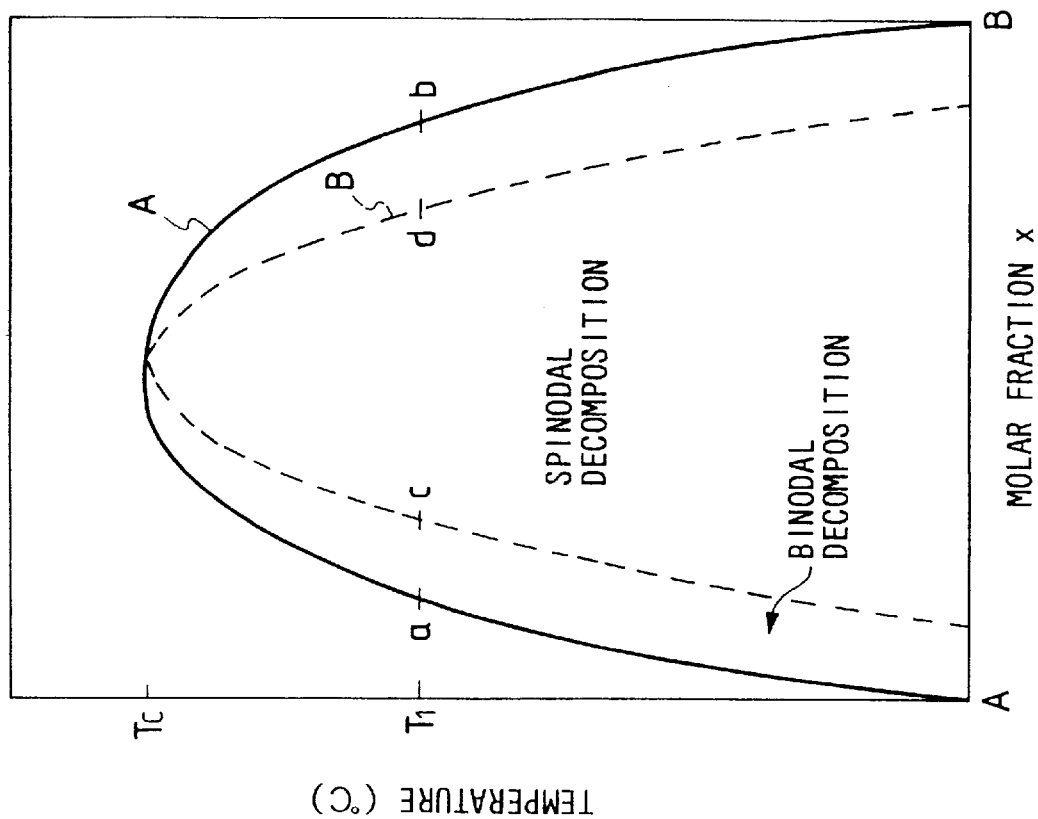
FIG. 6 and FIG. 7 illustrate the binodal decomposition and the spinodal decomposition.

Moreover, the curve (A) shown in solid line in FIG. 7 indicates the locus as plotted for the temperature at the point a and the point b on the curve $\Delta G-\chi$ described above. On the other hand, the curve (B) shown in broken line indicates the locus as plotted for inflection points c and d on the curve $\Delta G-\chi$ curve given above and demonstrates that the temperature-composition region enclosed by the curve (A) given above is the miscibility region.

Figure 8:
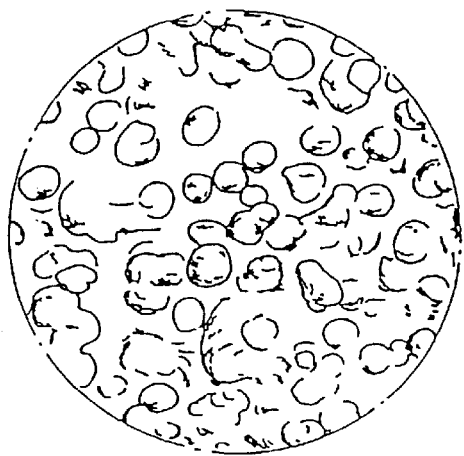
FIG. 8 is an enlarged chart illustrating the structure of the region where the phase separation has occurred along with the binodal decomposition.

Then, the temperature-composition region enclosed by the curve (A) and the curve (B), which are miscibility gap lines, in FIG. 7 is called the binodal region, and the phase separation in this region progresses by the binodal decomposition mechanism. This is tantamount to saying that, within this region, only those fluctuations in composition in excess of a given limit value, among the fluctuations which occur in composition in a single phase, will survive in a steady state and that those surviving fluctuations work as the nuclei for the phase separation, which progresses through the growth of such nuclei. Then, the difference in composition is distinct in the interfacial region between the two phases from the initial stage of the phase separation, and, as shown in the enlarged approximation of an electronic telescope photograph in FIG. 8, the nuclei which have attained growth are set in a spherical crystalline structure (or in an amorphous structure in some cases) different in composition from what is found in the original phase and have the Rayleigh scattering in them. Accordingly, there arises a difference in the reflection factor between the region where this phase separation has taken place and the region where the phase separation has not occurred, and it becomes possible to perform the optical recording through utilization of this difference in the reflection factor.

Figure 9:
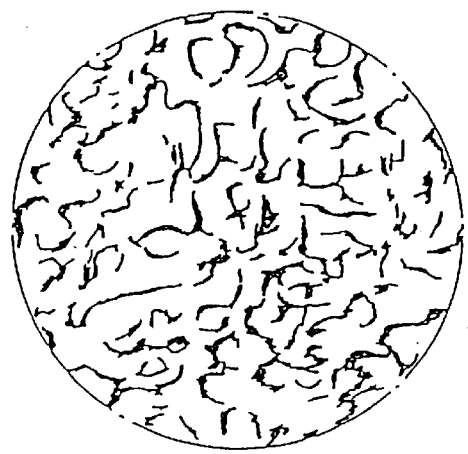
FIG. 9 is an enlarged chart illustrating the structure of the region where the phase separation has occurred along with the spinodal decomposition.

On the other hand, the temperature-composition region enclosed by the curve (B) in FIG. 7 is called "spinodal region" and, within this region, the phase separation progresses by the spinodal decomposition mechanism. That is to say, the minute fluctuations which occur initially in the composition in a single phase within this region promote the phase separation, which progresses with the predominance of diffusion. Then, in the initial period of the phase separation, the difference in the composition in the interfacial region of the two phases is continuous, and, as shown in the enlarged approximation of the electronic microscope photograph presented in FIG. 9, the phase separation structure assumes a form with the two phases in maze pattern with each other, giving rise to the Rayleigh scattering in the same way as in the case of the binodal decomposition. Therefore, also in this case, a difference occurs in the reflection factor between the region where the phase separation has taken place and the region where it has not occurred, and it is consequently possible to perform the optical recording process through utilization of this difference in the reflection factor.

At this juncture, it is noted that the spinodal decomposition does not accompany any nucleus formation, as compared with the binodal decomposition, and consequently requires proportionately less energy for the decomposition, so that the phase separation progresses at a faster speed than in the case of the binodal decomposition.

The present invention makes effective use of this property of the spinodal decomposition, and thus the recording process which utilizes the spinodal decomposition, therefore, offers the advantage that the process is capable of performing the recording operation at a speed faster than the process which uses the phase separation attending the binodal decomposition.

Furthermore, it is possible to cause the occurrence of the spinodal decomposition in the region which has already been processed for its phase separation by the binodal decomposition mechanism, and, conversely, it is possible to cause the occurrence of the binodal decomposition in the region where the phase separation has already been elicited by the spinodal decomposition. In specific terms, it is possible to cause the shift of the region processed by either of these processes to the state of phase separation attained in the other process by restoring the recording film which is in either one of the states to the state of a single phase by heating it to a temperature higher than the miscibility gap line and thereafter causing a binodal decomposition in this recording film by giving a gradual cooling treatment to the film or causing a spinodal decomposition in the film by giving a quenching treatment to it. Then, since there emerges a difference in the reflection factor between the region where the binodal decomposition has occurred and that where the spinodal decomposition has taken place, it is possible also to perform optical recording by utilizing this difference in the reflection factor, namely, setting the state of phase separation in one region in correspondence to the recording state and the state of phase separation in the other region in correspondence to the erasing state.

Moreover, in this recording process which utilizes the spinodal decomposition and the binodal decomposition, it is possible to give the quenching treatment and the gradual cooling treatment to the recording film by switching the output of the irradiating beam. Therefore, this process offers the advantage that the information can be rewritten by one beam by applying a single recording and erasing beam which can thus be selectively switched over for a change of its output.

Furthermore, in addition to the above-mentioned recording process which makes use of the phase separation between the spinodal decomposition and the binodal decomposition, it is possible to perform the rewriting of information by one beam, for example, also in the process which utilizes the difference in the optical properties between the amorphous phase of the recording material and the phase separation attending the binodal decomposition in the film. That is to say, it is possible to cause a shift of one state of phase to the other by causing a phase separation attending the binodal decomposition by giving a gradual cooling treatment to the recording film, or by changing it into its amorphous phase by giving it a quenching treatment, after once restoring the recording film, which is in either one of the states, to its single phase state by heating it to a temperature higher than its miscibility gap line. Consequently, it becomes possible to rewrite the information by one beam, for example, by setting the amorphous phase in correspondence to the recording state and setting the other state of phase separation in correspondence to the erasing state.

Furthermore, in case the phase separation is in the course of its progress by the binodal decomposition accompanying the nucleus growth, it sometimes happens that the spinodal decomposition progresses in parallel within this nucleus. In this case, a maze pattern structure is observed within the nucleus, in comparison with the case in which the binodal decomposition occurs independently, and the reflection factor in this region where this phase separation has occurred is different from that found in the case where the binodal decomposition occurs alone.

Therefore, it is possible also to record tertiary value signals by using the differences in the reflection factor among the region where the phase separation has not occurred, the region where the binodal decomposition and the spinodal decomposition have occurred, and the region where only the binodal decomposition has occurred.

Figure 15:
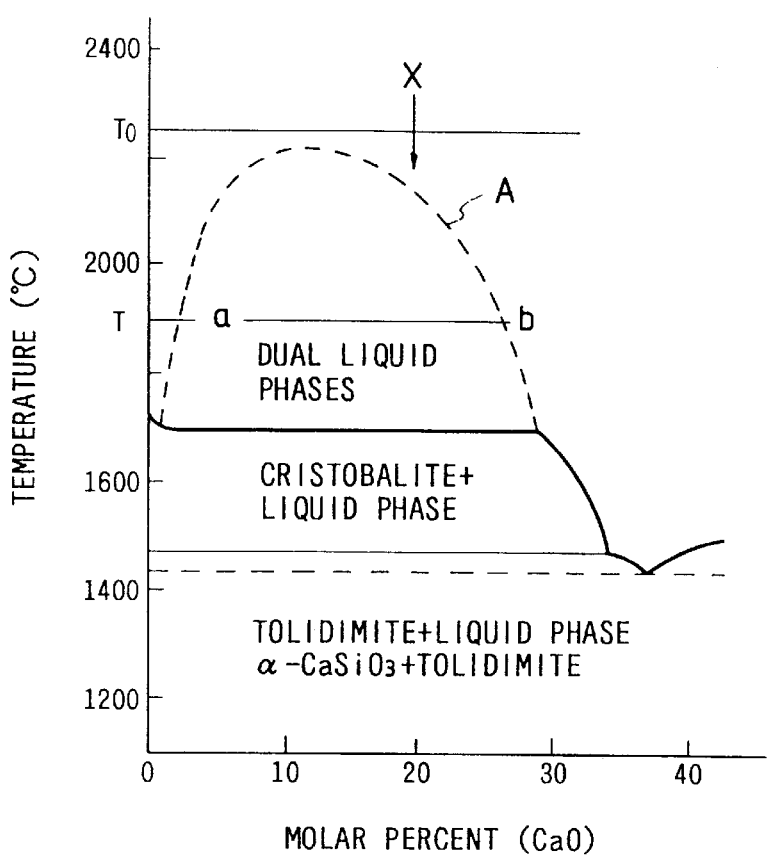
Figure 16:
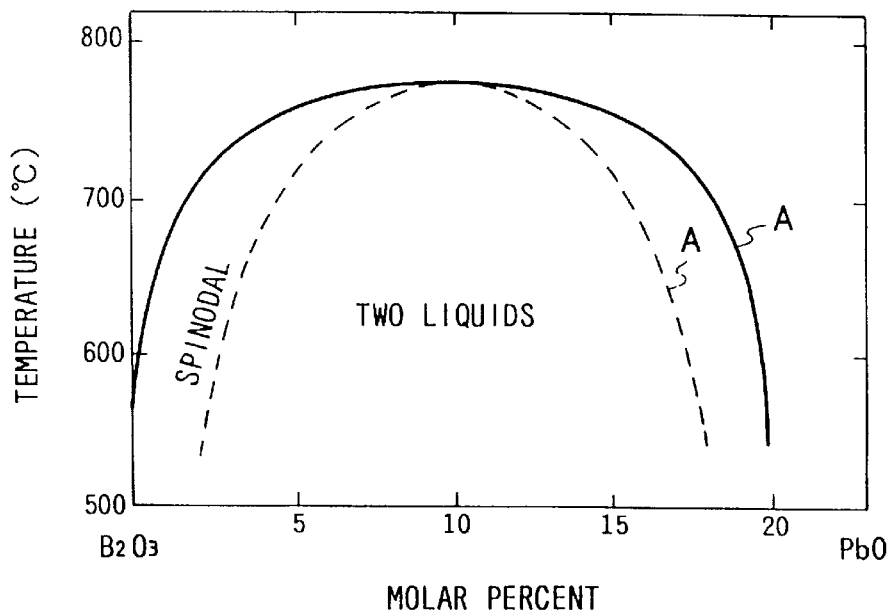
Figure 17:
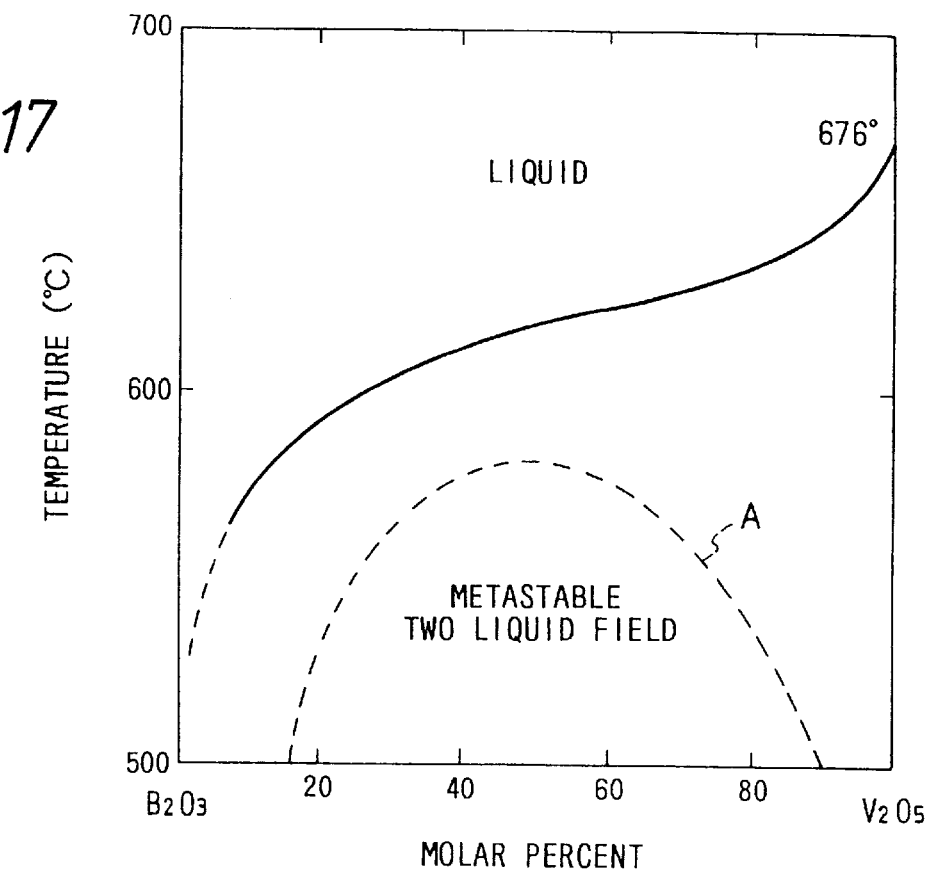
Figure 18:
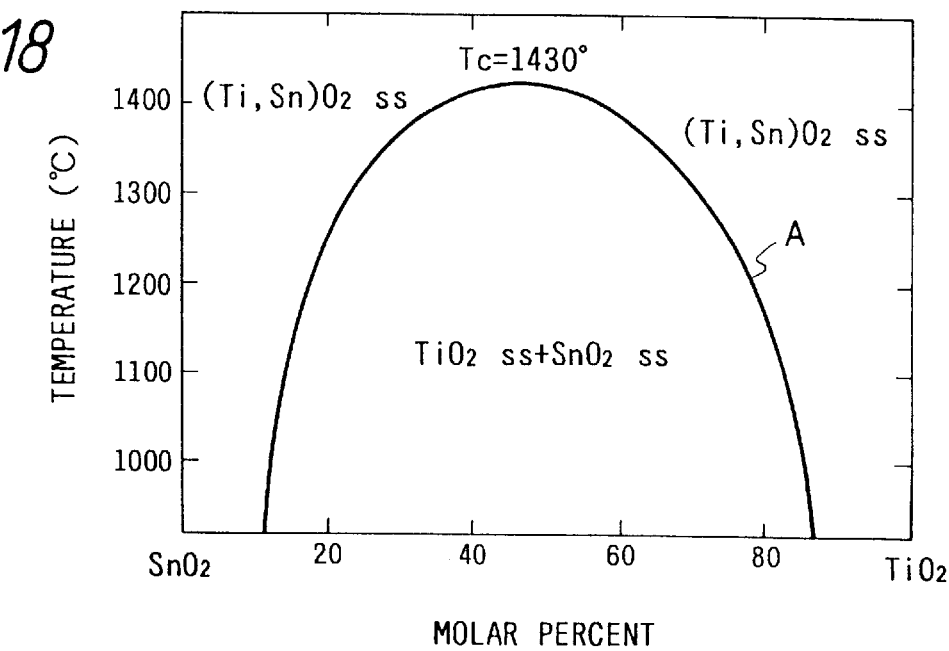
Figure 19:
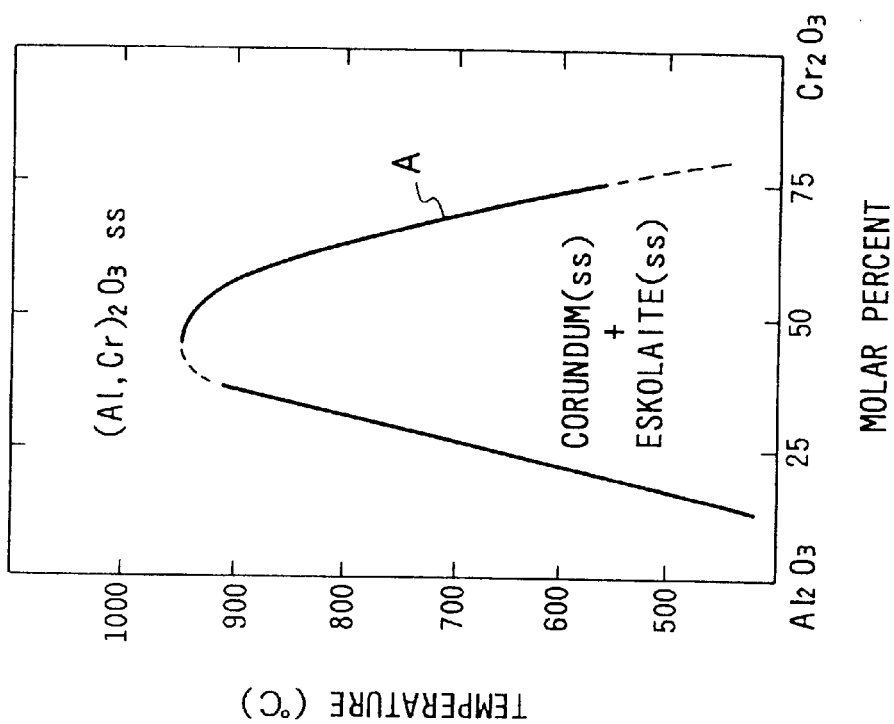
Figure 20:
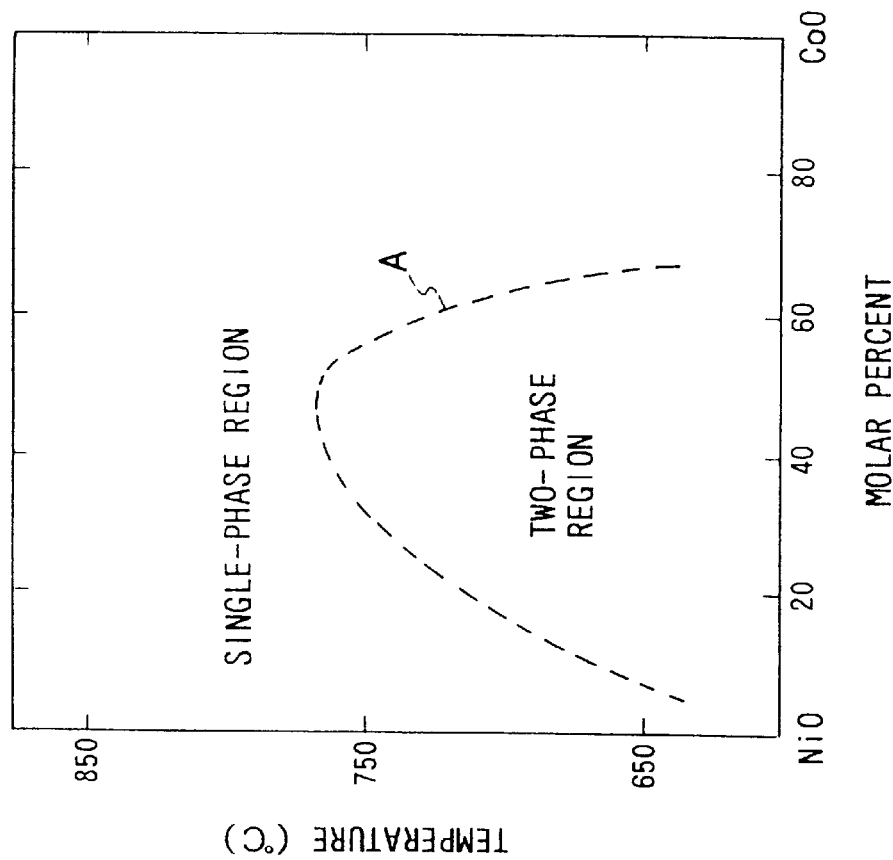
Figure 21:
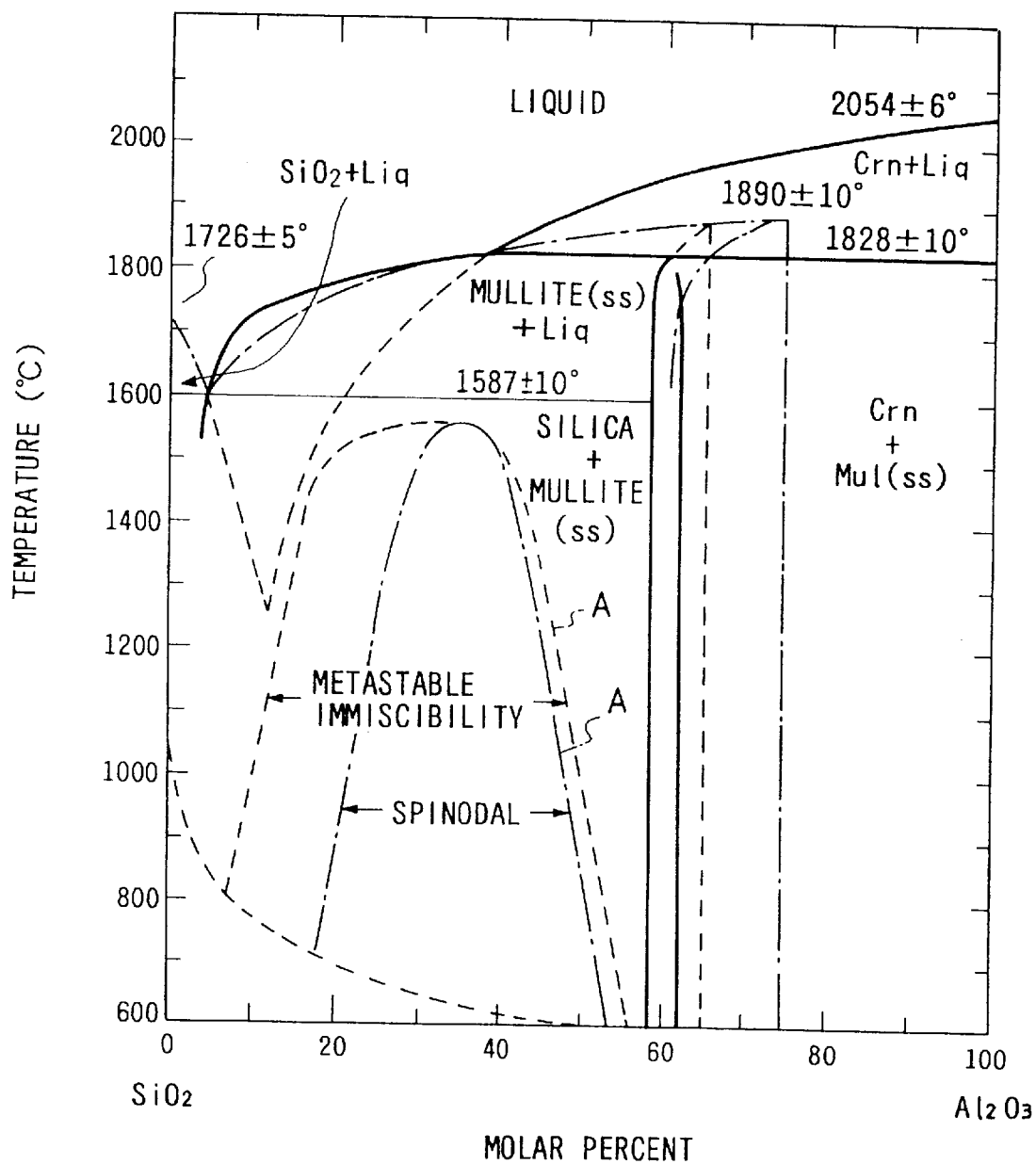
Figure 22:
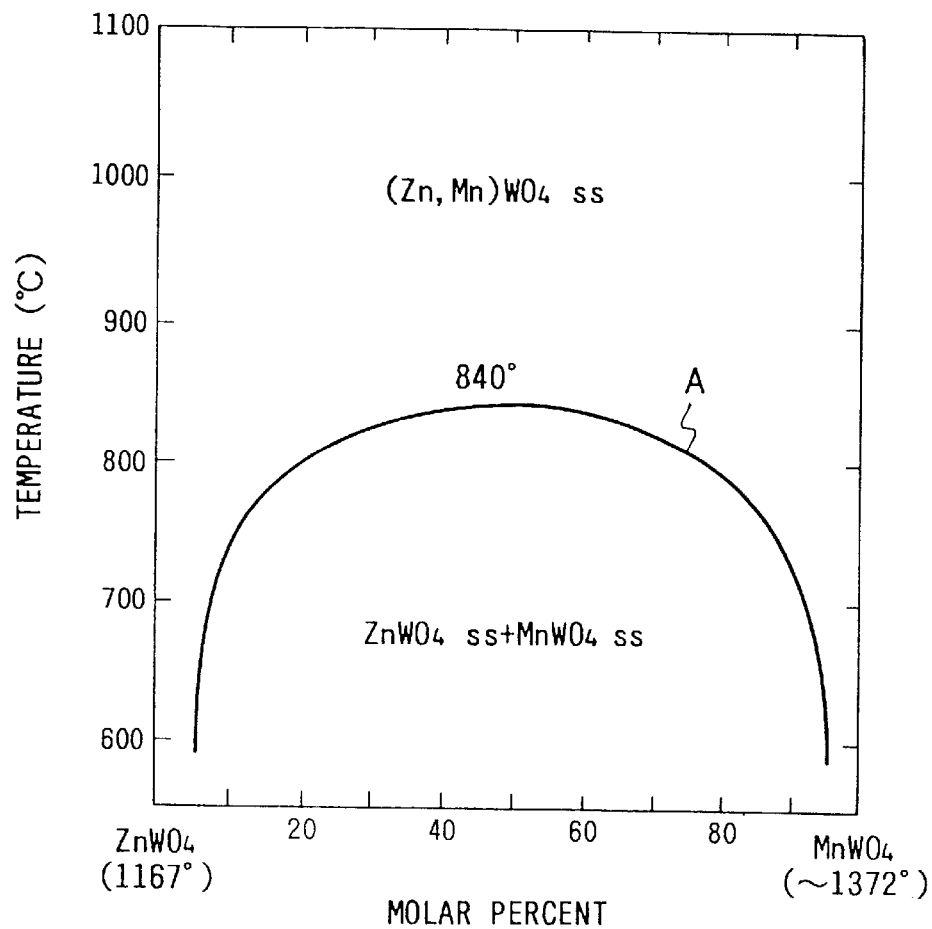
Figure 23:
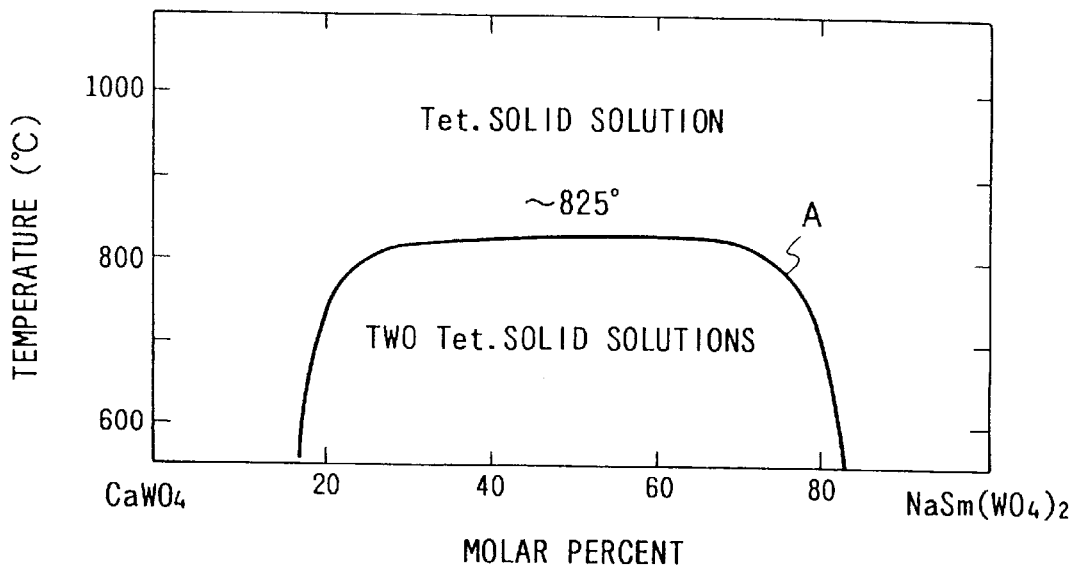
Figure 24:
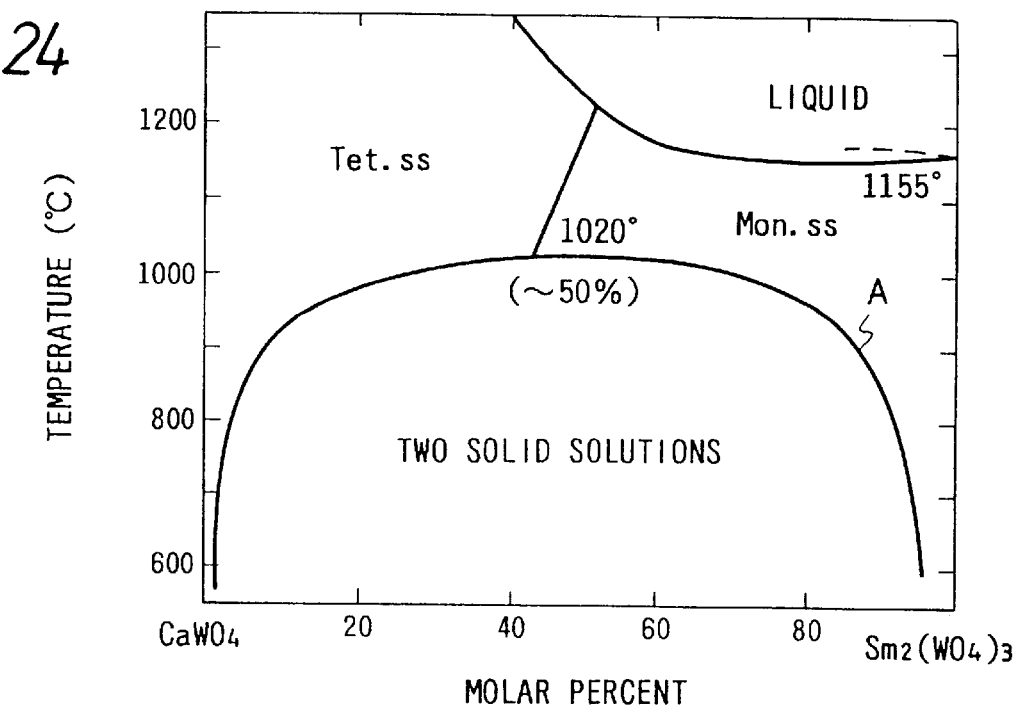
Figure 25:
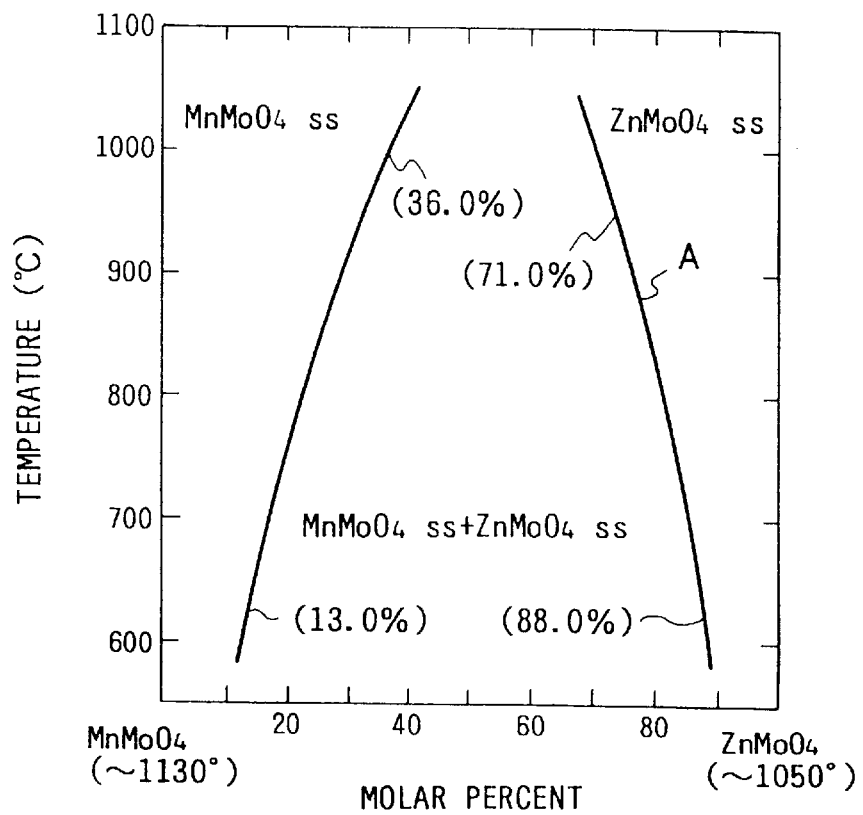
Figure 27:
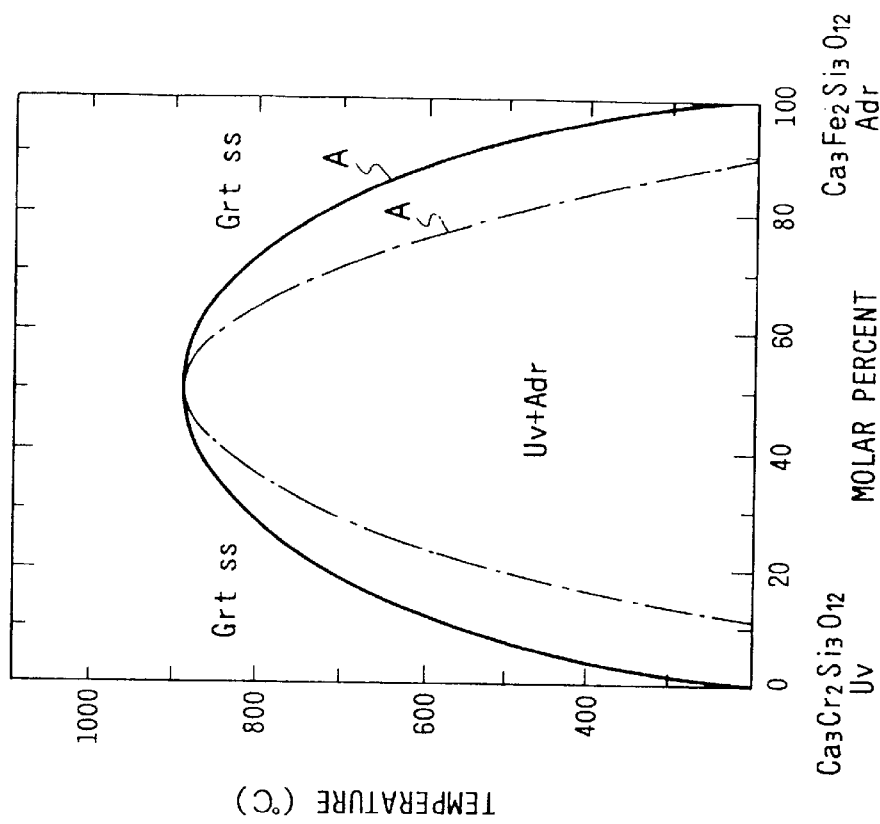
Figure 26:
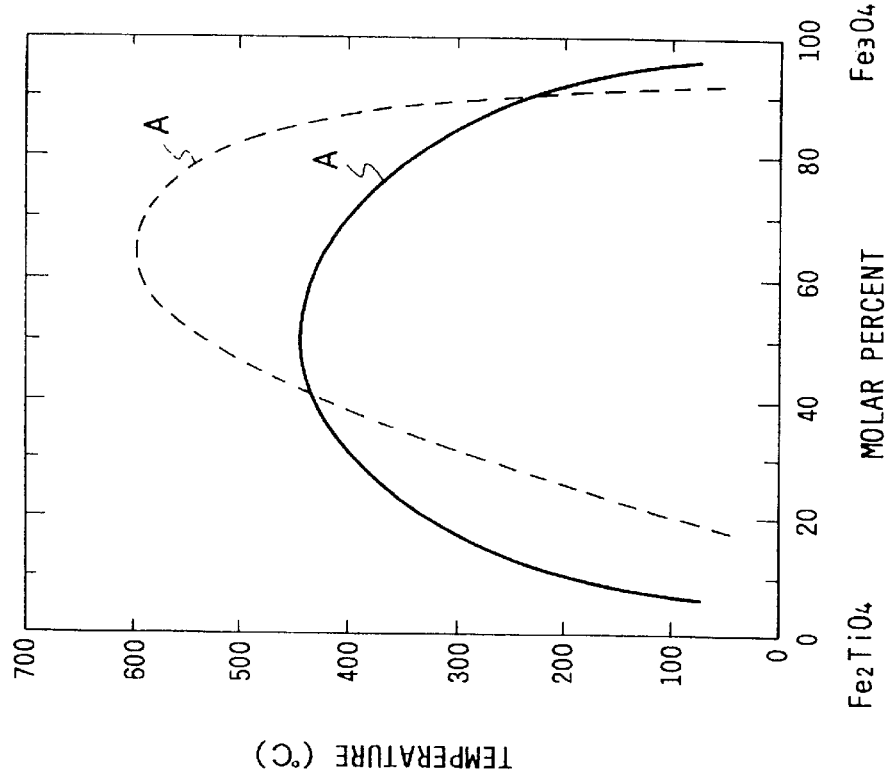
Figure 28:
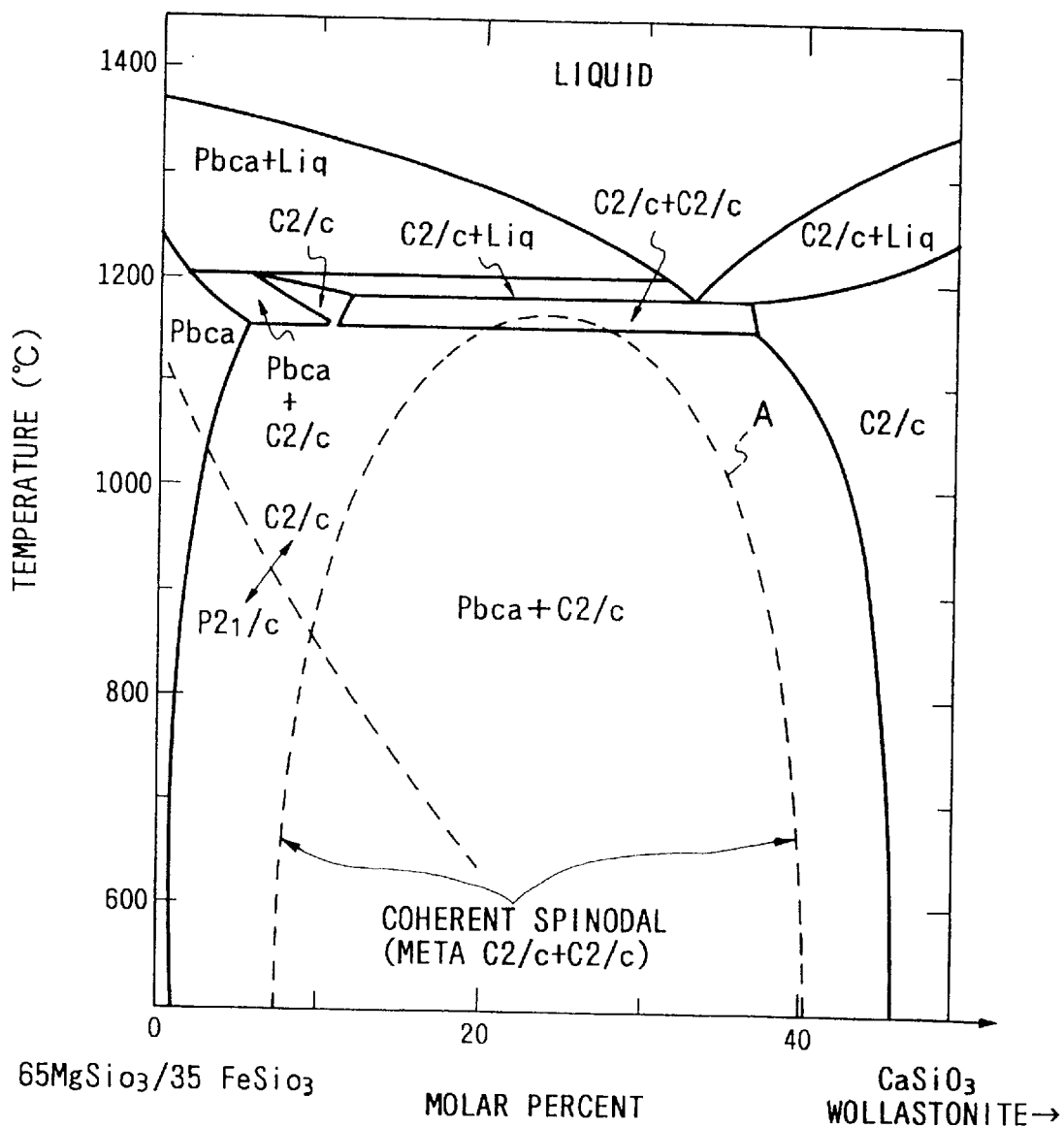

Next, the miscibility gap mentioned above appears in the solid phase region (for example, refer to the phase diagrams or the like given in FIG. 10 through FIG. 14) in some cases and appears in the liquid phase region (for example, refer to the phase diagrams or the like given in FIG. 15 through FIG. 17) in other cases in a mixed body composed of two constituents as expressed by the constituent A and the constituent B. In case either one of these recording materials is applied, it is necessary to set the condition for the irradiation of a laser beam or the like for the performance of recording at a temperature higher than its miscibility gap line.

Here, in case of the application of a recording material for which the miscibility gap appears in the liquid phase region, the recording film undergoes dissolution by the irradiation of a laser beam set at the prescribed temperature, and the mixture of the two constituents in the recording film is thereby mixed into a state of a single phase, and the recording film is thereafter cooled to shift again to a new state and the attain a phase separation. Thus, this process offers the advantage that it is capable of rewriting the information by one beam as mentioned above through adjustment of this cooling speed.

Moreover, according to the present invention, a process which makes dexterous use of the recording material in which this miscibility gap line appears in the liquid phase region and is characterized by its performance of the rewriting of information with one beam by irradiating a single beam for recording and erasing with its output changed selectively.

On the other hand, in case a recording material in which the miscibility gap mentioned above appears in the solid phase region, the recording film remains in the state of its solid phase even under the temperature condition that the temperature in the irradiating conditions of a laser beam or the like is set at a level higher than the miscibility gap line, and consequently the diffusing speed is so low that the recording film will not necessarily form any completely uniform phase, in which case it is not possible to apply the process of rewriting the information with one beam as described above. Therefore, in case any material in which the miscibility gap appears in the solid phase region is applied, it will be made possible to apply the information rewriting process with one beam if the irradiating condition for the laser beam or the like is set at a temperature above the liquid phase region, which is still higher than the solid phase region mentioned above. However, in case the information rewriting process with one beam is not employed, it is of course feasible to set the irradiating condition for the laser or the like mentioned above at a temperature within the solid phase region.

Moreover, the materials which cause the binodal decomposition or the spinodal decomposition as described above are alloys and mixtures containing two or more oxides or halogenides out of the oxides and halogenides of the individual elements selected out of the following groups of elements:

IA group (Li, Na, K, Rb, Cs, Fr)

IIA group (Be, Mg, Ca, Sr, Ba, Ra)

IIIA group (Sc, Y)

IVA group (Ti, Zr, Hf)

VA group (V, Nb, Ta)

VIA group (Cr, Mo, W)

VIIA group (Mn, Tc, Re)

VIIIA group (Fe, Co, Ni, Ru, Rh, Pd, Os, Ir, Pt)

IB group (Cu, Ag, Au)

IIB group (Zn, Cd, Hg)

IIIB group (B, Al, Ga, In, Tl)

IVB group (Si, Ge, Sn, Pb)

VB group (As, Sb, Bi)

VIB group (Se, Te, Po)

Lanthanoids (Ce, Pr, Nd, Pm, Sm, bu, Gd, Tb, Dy, Ho, Br, Yb)

Actinoids (Ac, Th, Pa)

Figure 10:
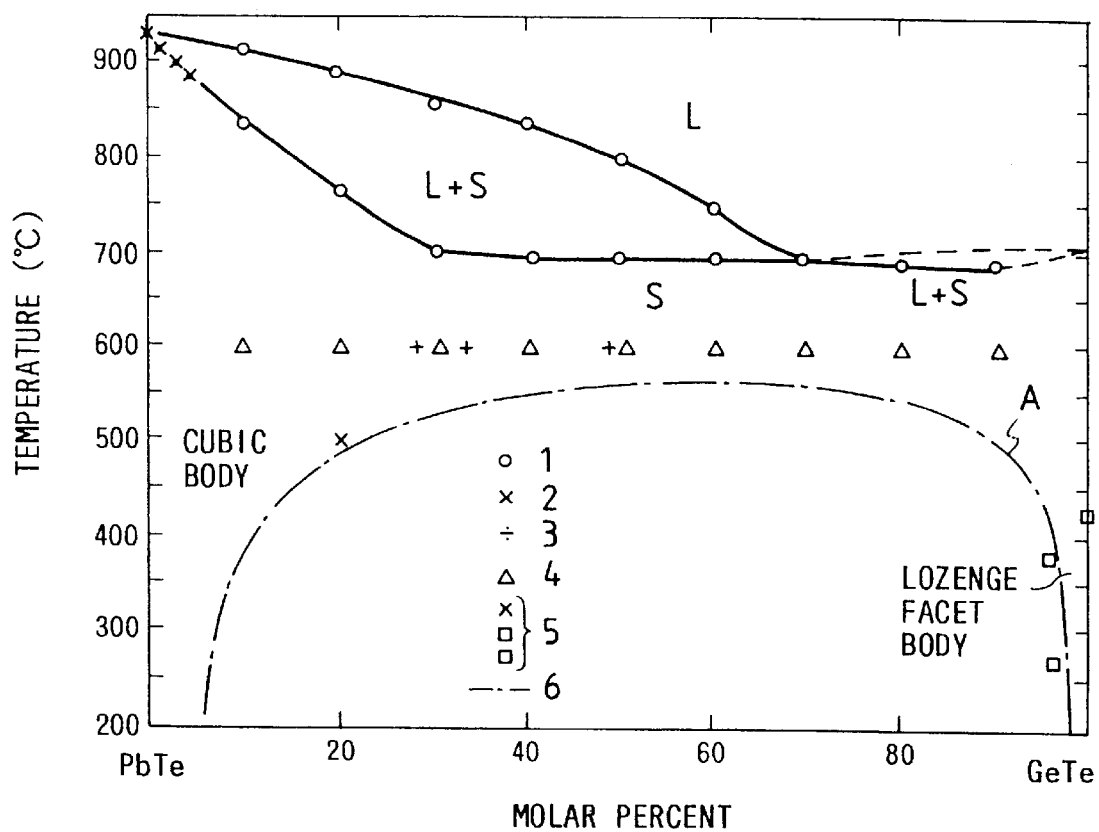
FIG. 10 through FIG. 48 respectively present the quasi binary phase diagrams for the materials which can be used for the recording film as defined herein for the present invention.
Figure 12:
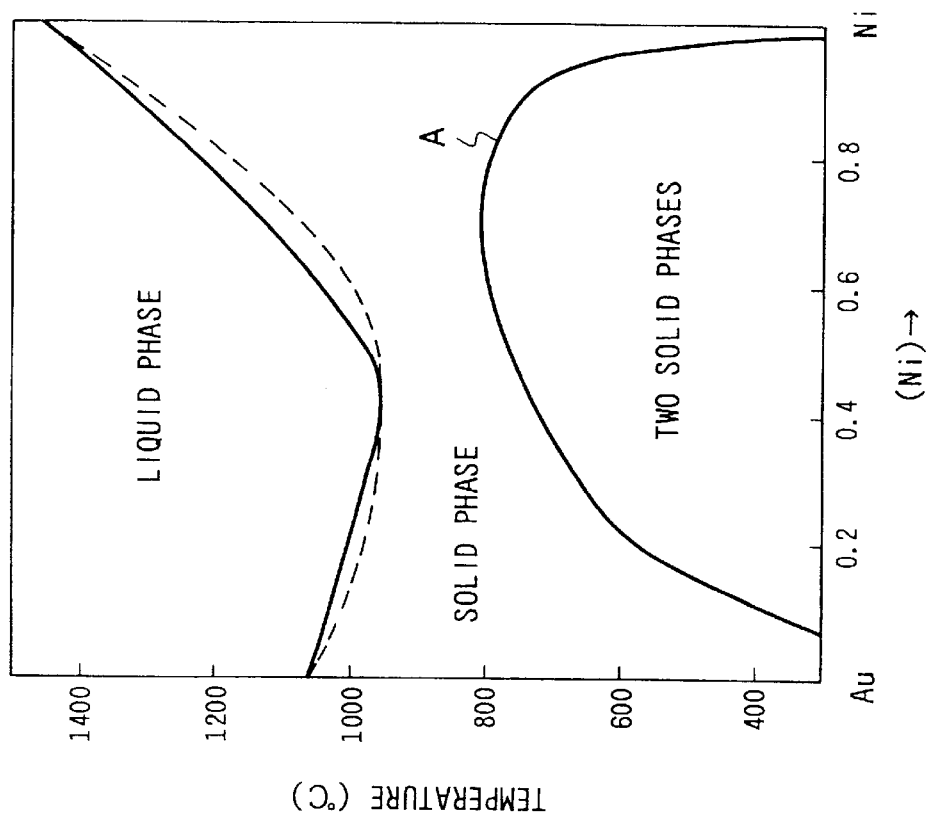
Figure 11:
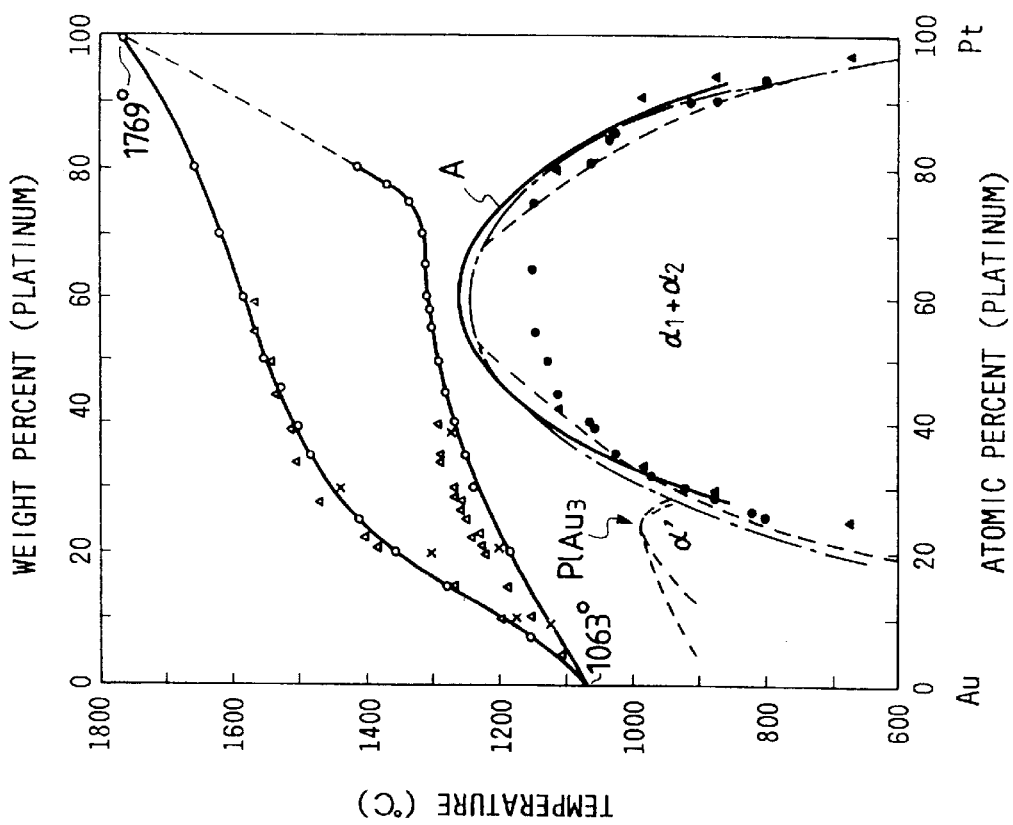
Figure 14:
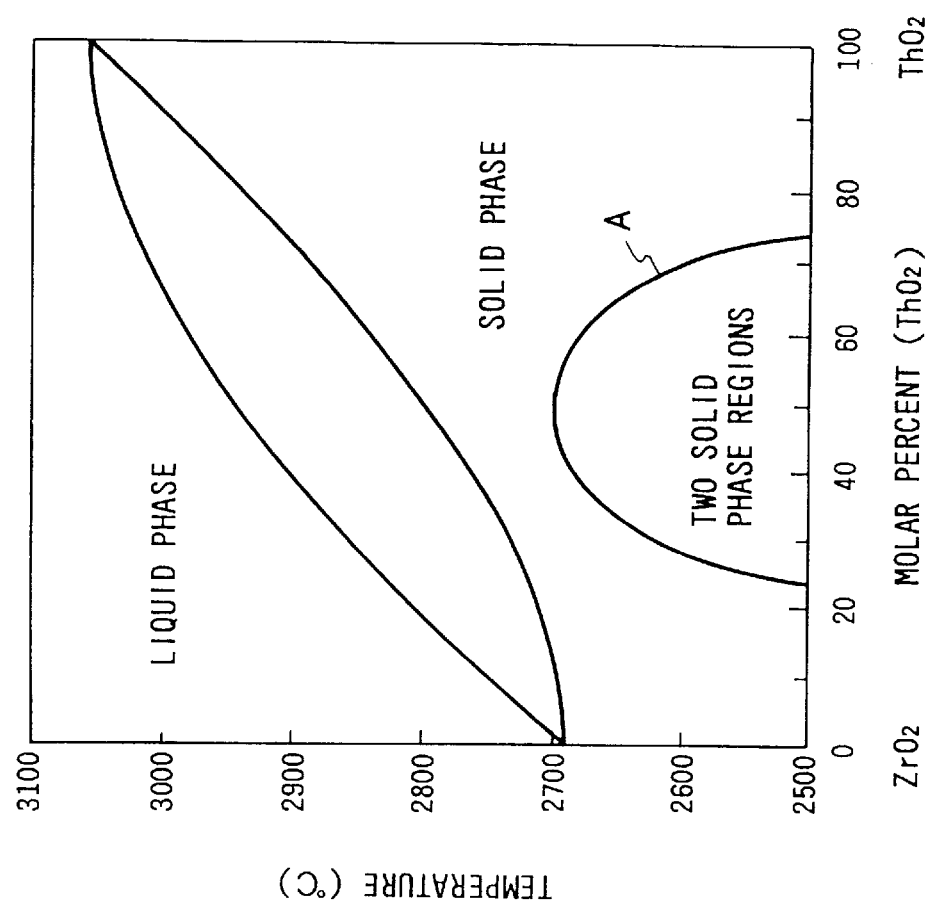
Figure 13:
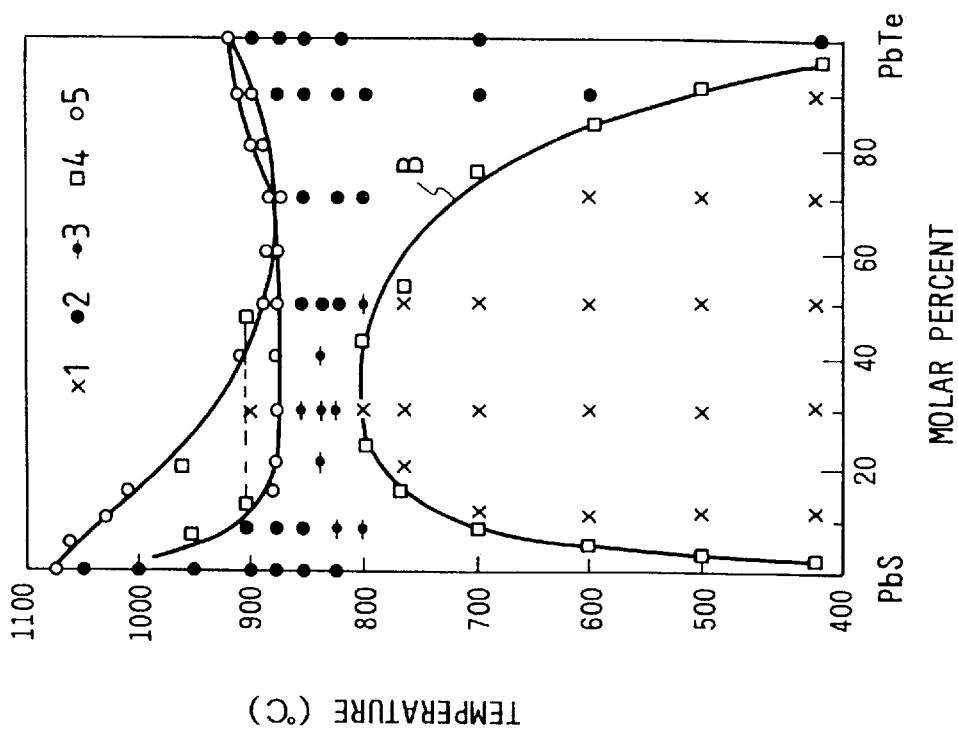

To name specific materials, the following alloys which have been ascertained to cause the binodal decomposition from the binodal curve (A) in the phase diagrams given in FIG. 10 through FIG. 12 and the following alloys which have been ascertained to cause the spinodal decomposition from the spinodal curve (B) in the phase diagram given in FIG. 13 can be listed as such materials:

Mixtures of PbTe—GeTe (FIG. 10)

Mixtures of Au—Pt (FIG. 11)

Mixtures of Au—Ni (FIG. 12)

Mixtures of PbS—PbTe (FIG. 13) and

Mixtures of $GeSe_2$—GeSe (For example, $Ge_{41.25}Se_{58.75}$)

Mixtures of As—Ge—Te (For example, $As_4Ge_{15}Te_{81}$)

Also, the following materials, which are oxide—oxide mixtures that have been ascertained to cause the binodal decomposition or the spinodal decomposition in light of the literature cited in the brackets:

Mixtures of $Li_2O$—$SiO_2$ (Y. Moriya, D. H. Warrington, and R. W. Douglas, Phys. Chem. Glasses, 8,19, (1967))

Mixtures of $Na_2O$—$SiO_2$ (Y. Moriya, D. H. Warrington, and R. W. Douglas, Phys. Chem. Glasses, 8,19 (1967))

Mixtures of BaO—$Sio_2$ (T. P. Seward, D. R. Uhlman, and D. Turnbull, Phys. Chem. Glasses, 51,278 (1967))

Mixtures of $Al_2O_3$—$SiO_2$ (J. F. Macdowell and G. H. Beal, J. Am. Ceram. Soc., 52,17 (1969))

Mixtures of $B_2O_3$—$SiO_2$ (R. J. Charles and F. G. Wagstagg, J. Am. Ceram. Soc., 51,16 (1968))

Mixtures of $Li_2O$—$B_2O_3$ (R. R. Shaw and D. R. Uhlmann, J. Am. Ceram. Soc., 51,377 (1968))

Mixtures of $Na_2O$—$B_2O_3$ (R. R. Shaw and D. R. Uhlmann, J. Am. Ceram. Soc., 51,377 (1968))

Mixtures of $K_2O$—$B_2O_3$ (R. R. Shaw and D. R. Uhlmann, J. Am. Ceram. Soc., 51,377 (1968))

Mixtures of $Rb_2O$—$B_2O_3$ (R. R. Shaw and D. R. Uhlmann, J. Am. Ceram. Soc., 51,377 (1968))

Mixtures of $Cs_2O$—$B_2O_3$ (R. R. Shaw and D. R. Uhlmann, J. Am. Ceram. Soc., 51,377 (1968))

Mixtures of PbO—$B_2O_3$ (J. H. Simons, J. Am. Ceram. Soc., 56,286 (1973))

Figure 30:
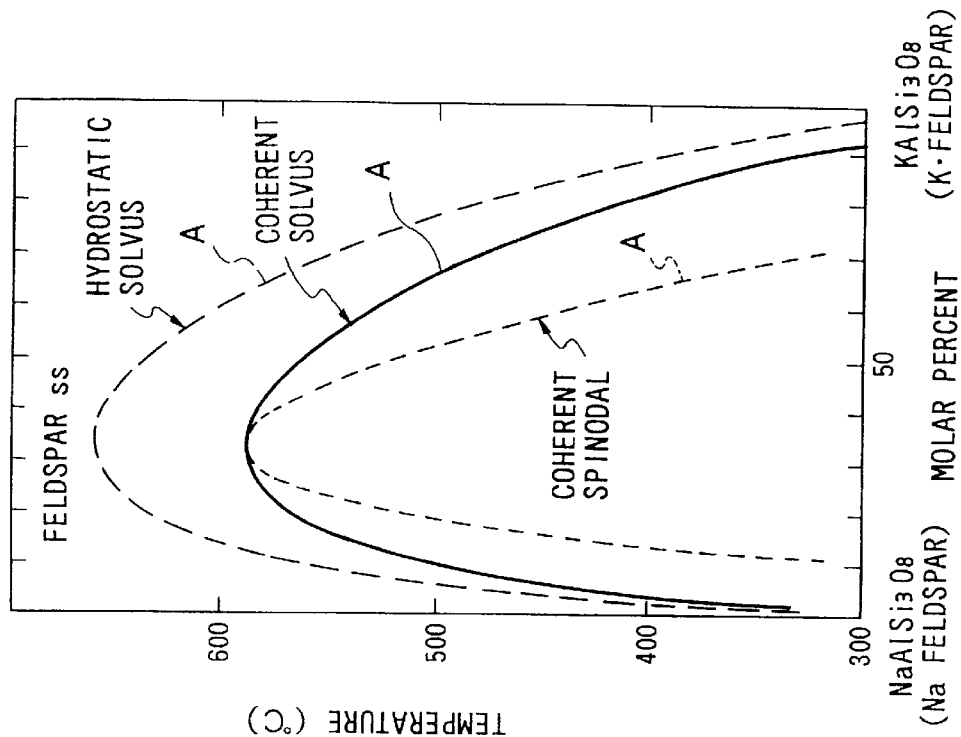
Figure 29:
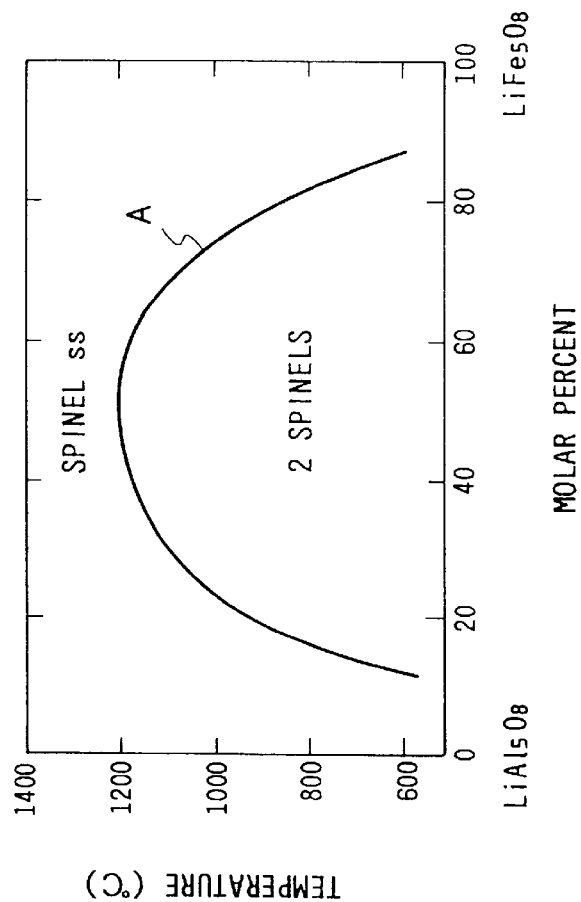
Figure 32:
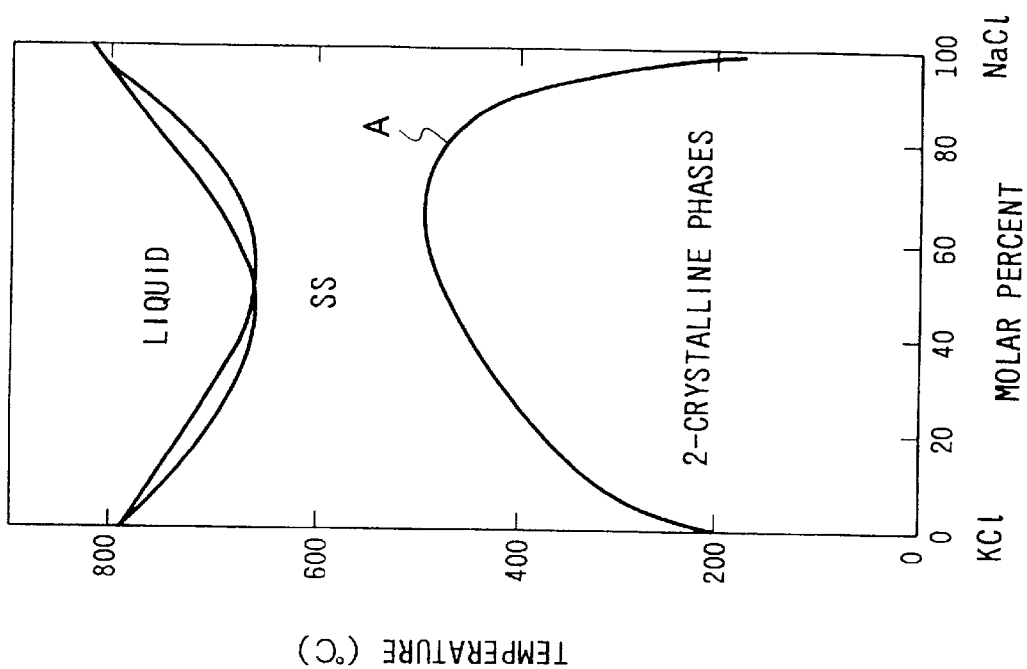
Figure 31:
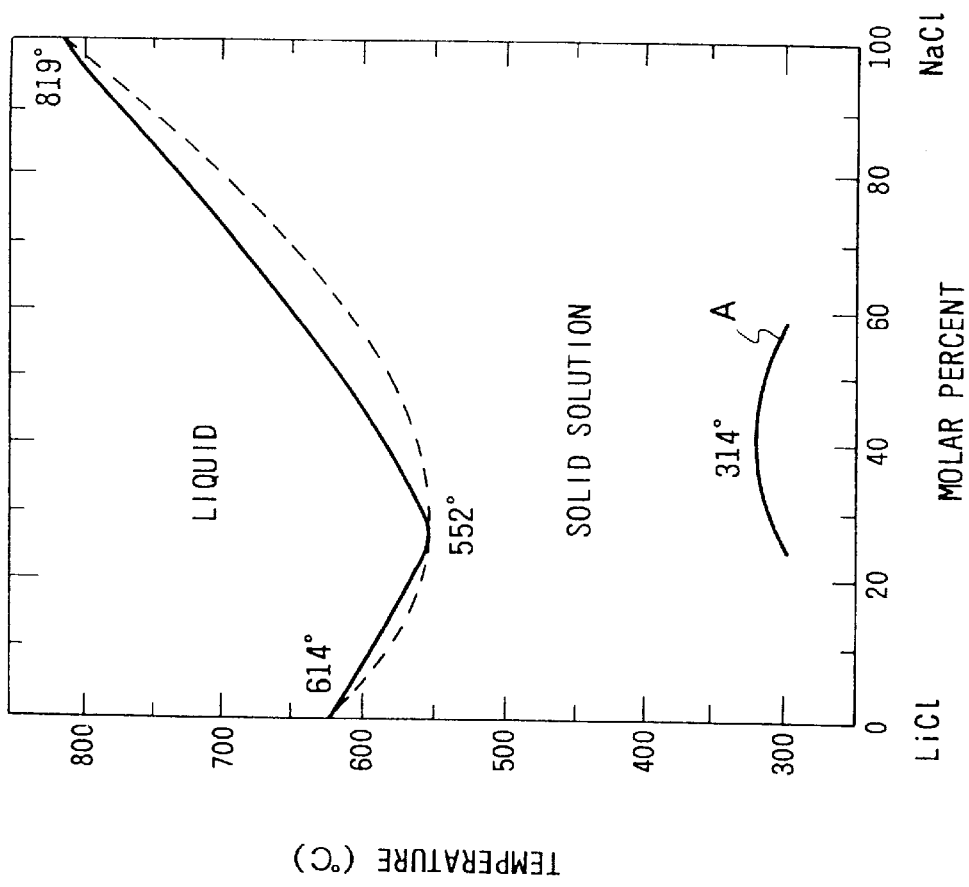
Figure 33:
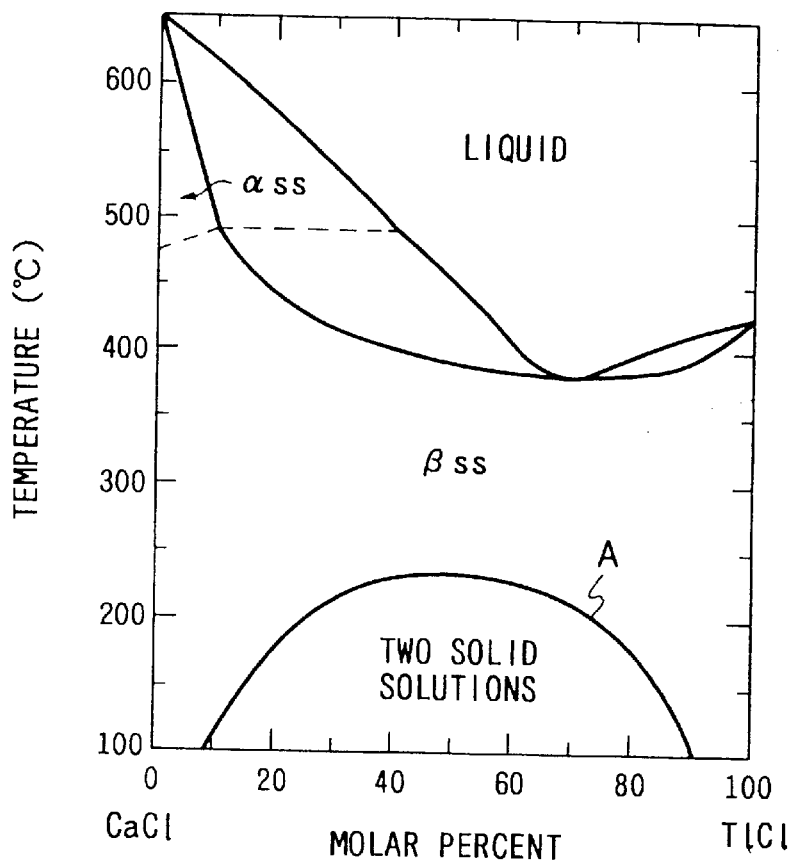
Figure 34:
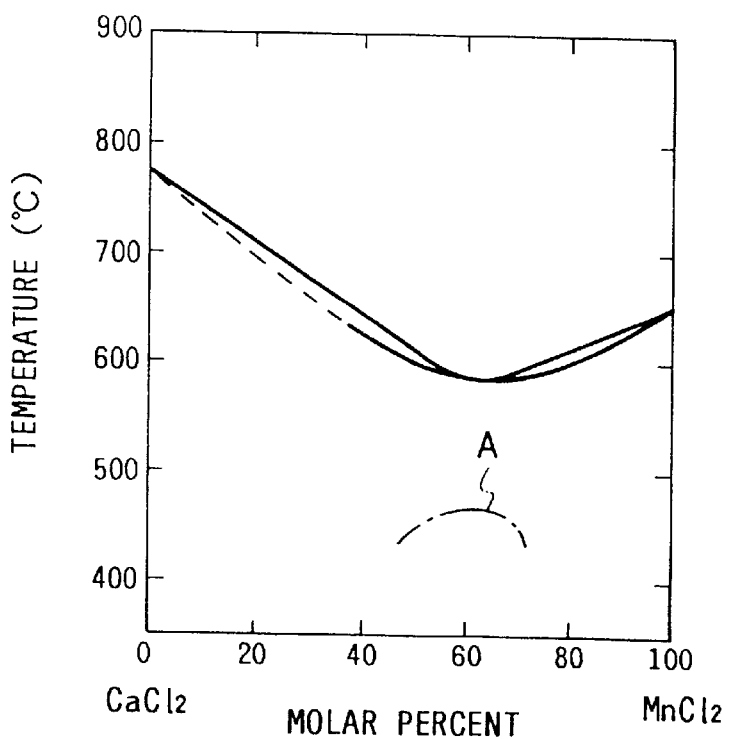
Figure 35:
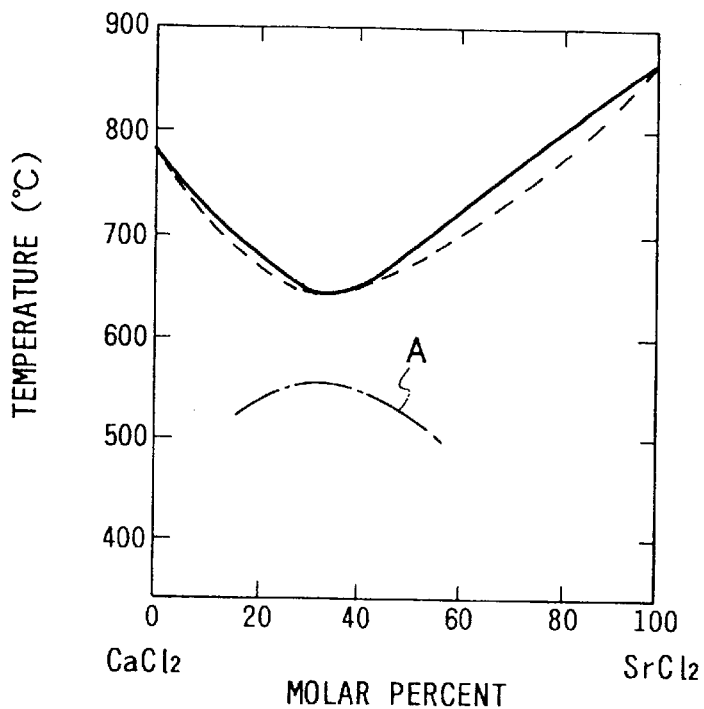
Figure 36:
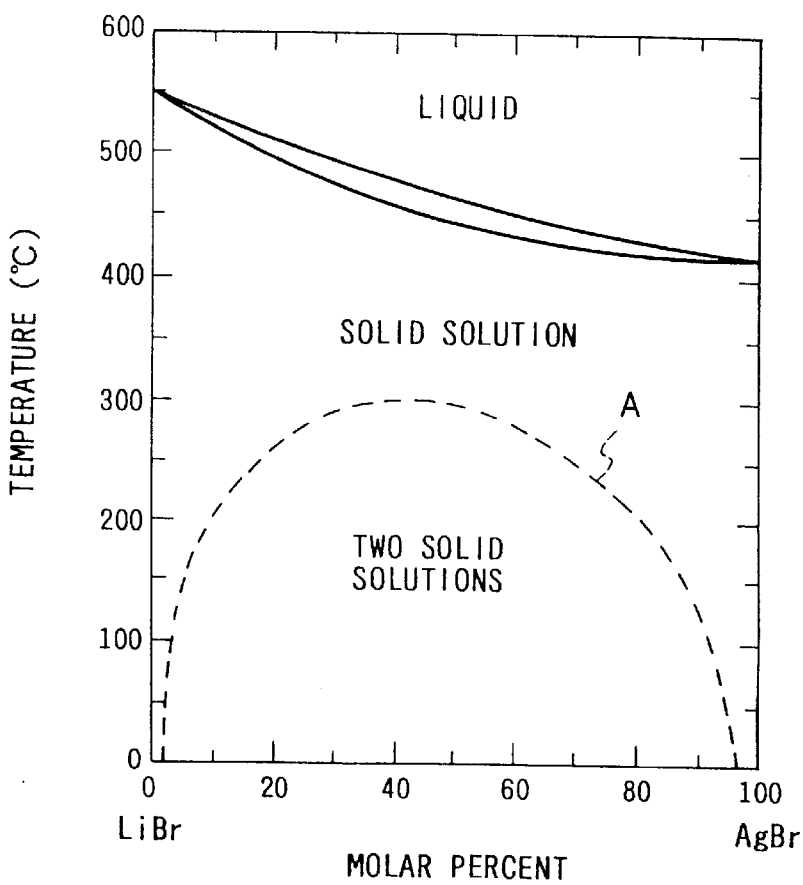
Figure 38:
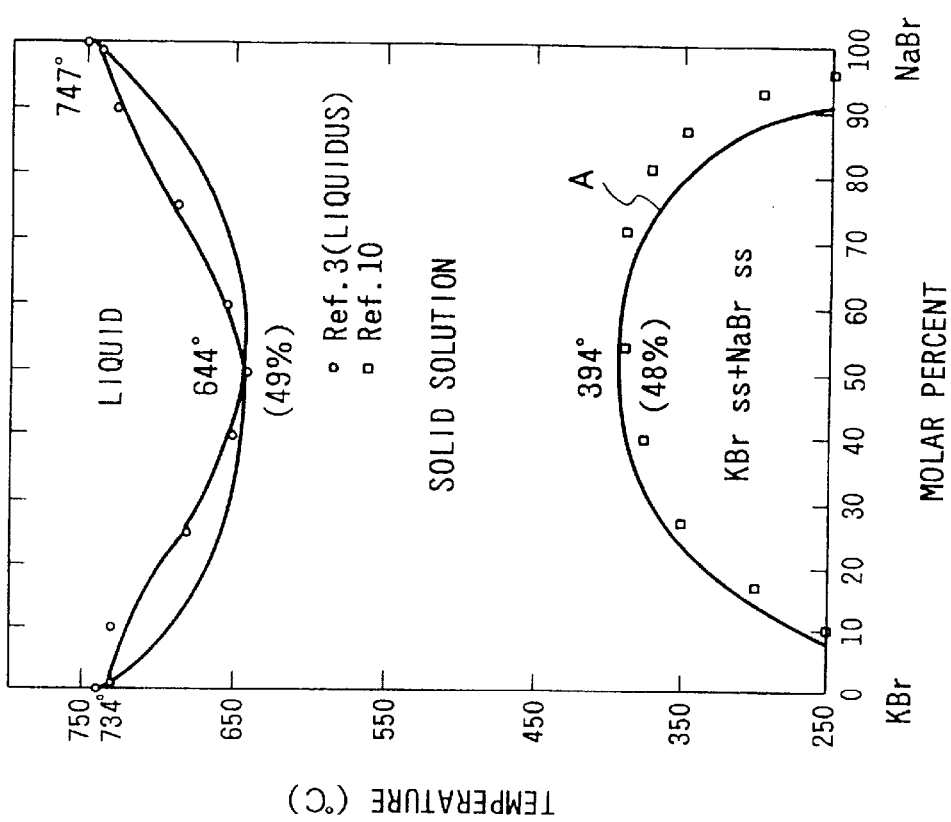
Figure 37:
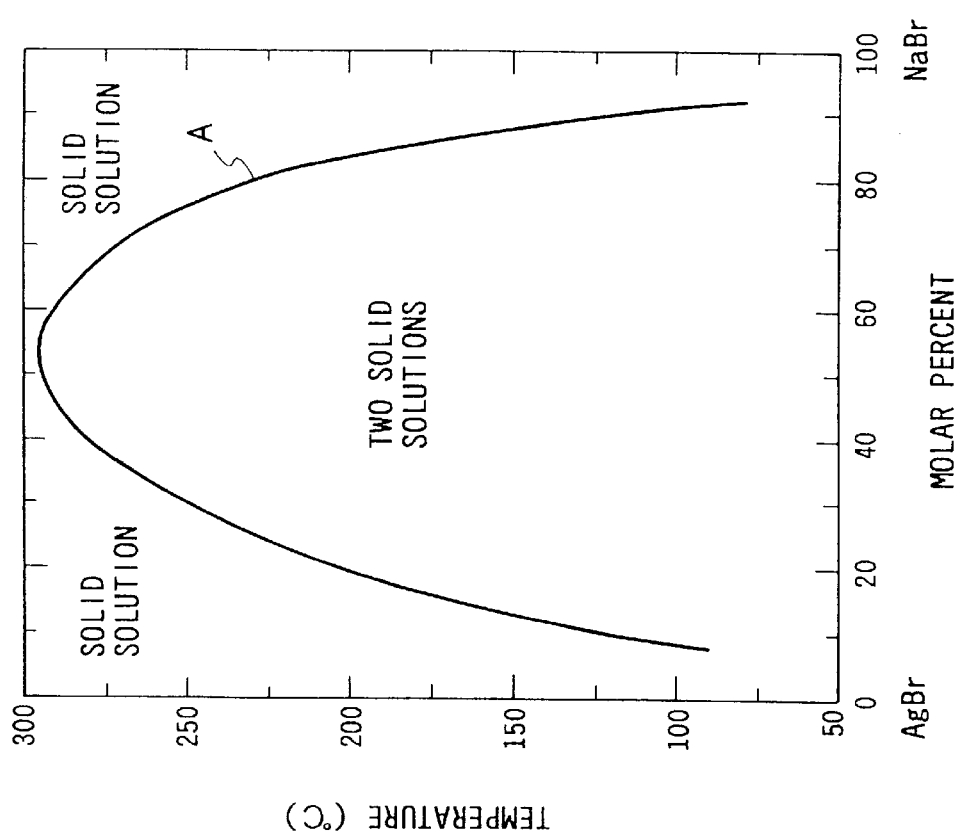
Figure 40:
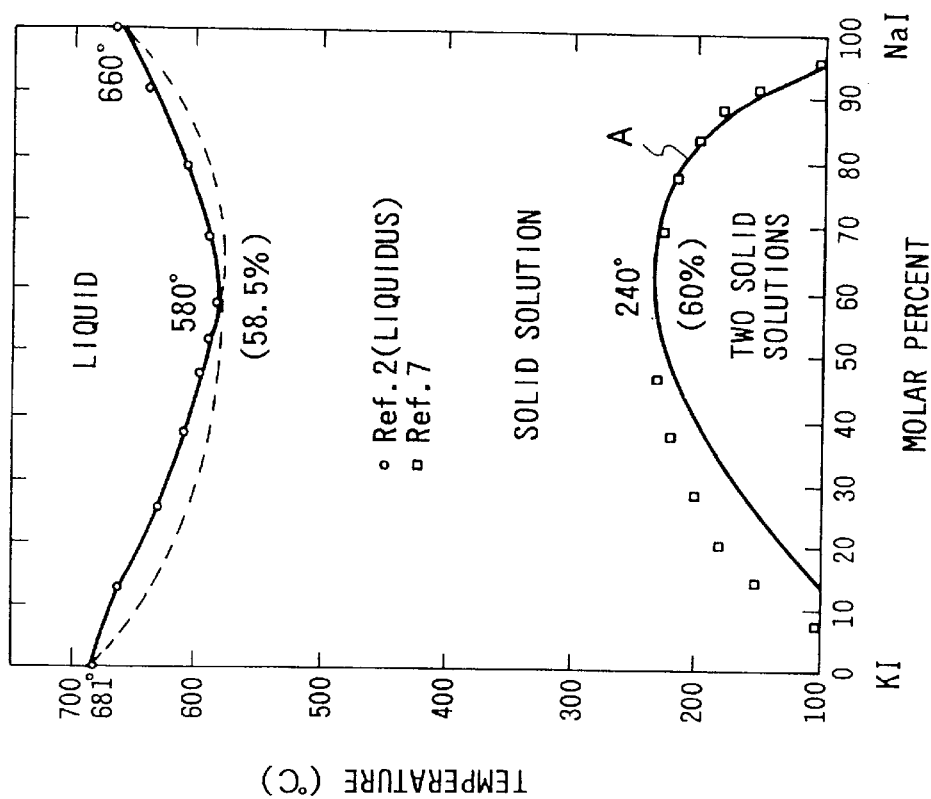
Figure 39:
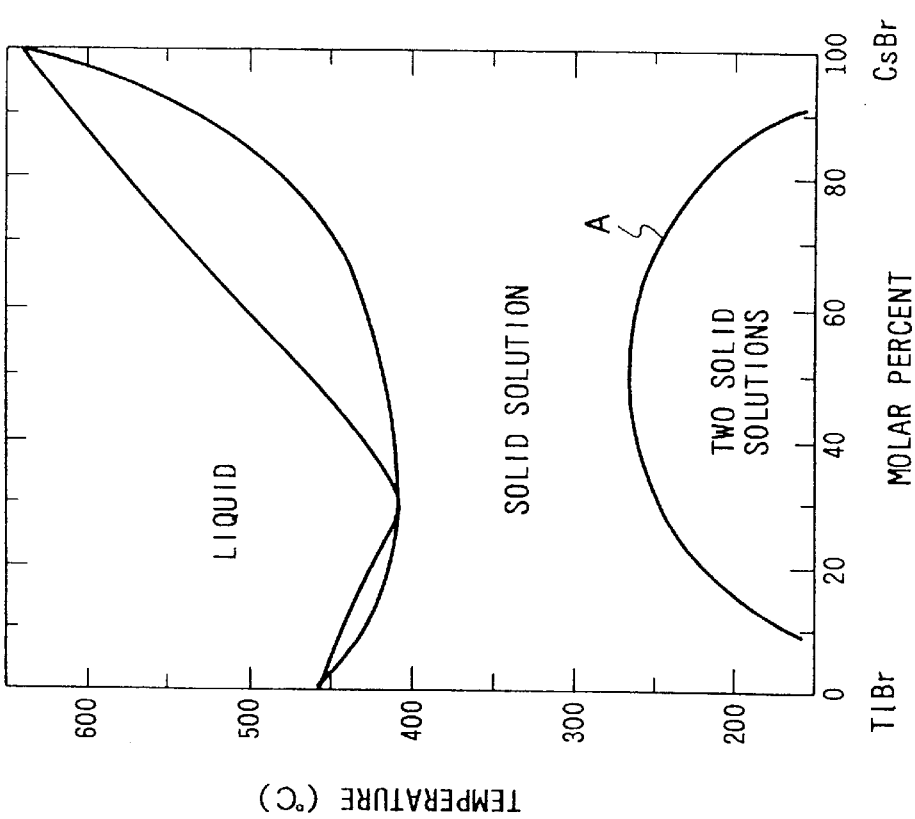
Figure 42:
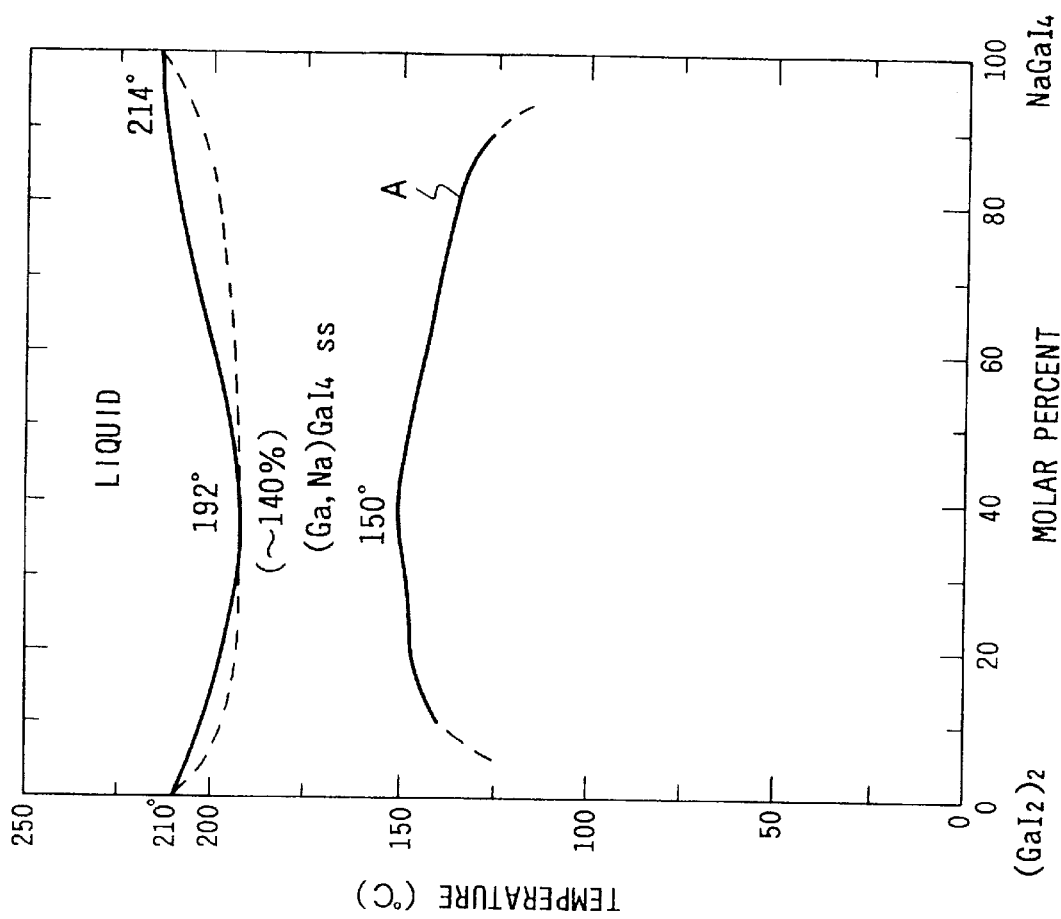
Figure 41:
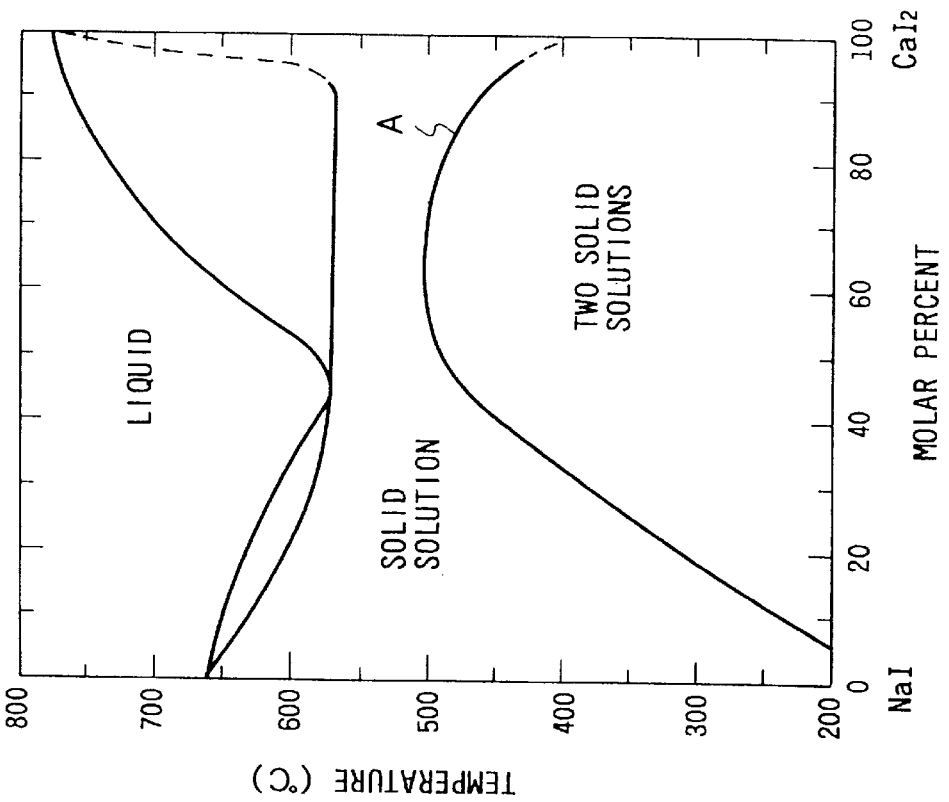
Figure 43:
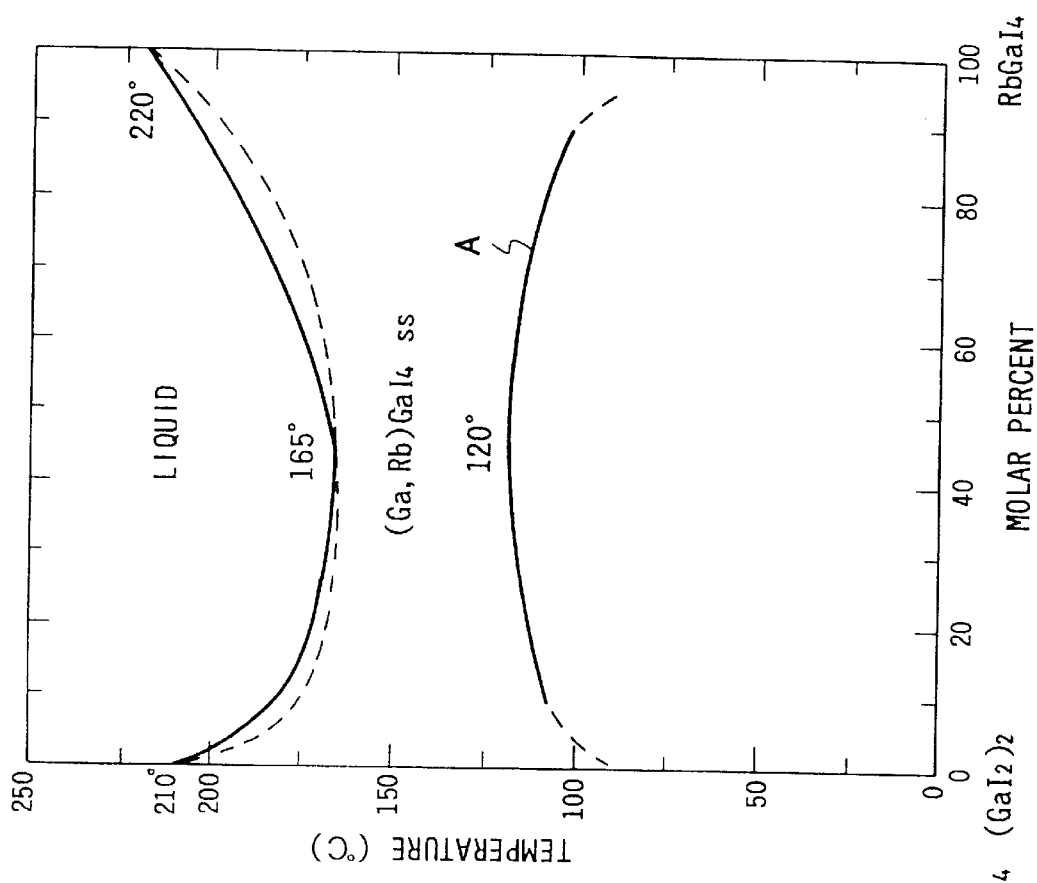
Figure 44:
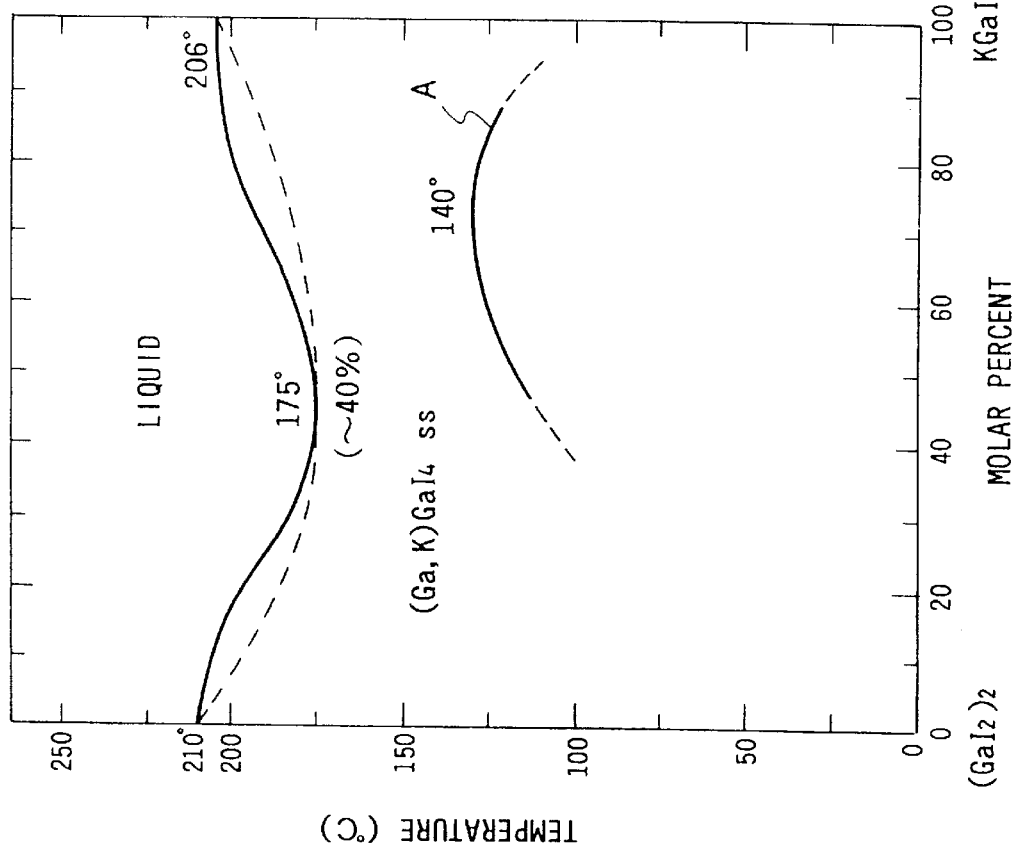

Also, the following materials which are mixtures of oxide—oxide and ascertained to cause the phase separation from the miscibility gap line (A) in the phase diagrams given in FIG. 14 through FIG. 30 can be listed as such materials:

Mixtures of $ZrO_2$—$ThO_2$ (FIG. 14)
Mixtures of CaO—$SiO_2$ (FIG. 15)
Mixtures of $B_2O_3$—PbO (FIG. 16)
Mixtures of $B_2O_3$—$V_2O_3$ (FIG. 17)
Mixtures of $SnO_2$—$TiO_2$ (FIG. 18)
Mixtures of NiO—CoO (FIG. 19)
Mixtures of $Al_2O_3$—$Cr_2O_3$ (FIG. 20)
Mixtures of $SiO_2$—$Al_2O_3$ (FIG. 21)
Mixtures of $ZnWO_4$—$MnWO_4$ (FIG. 22)
Mixtures of $CaWO_4$—$NaSm(WO_4)_2$ (FIG. 23)
Mixtures of $CaWO_4$—$Sm_2(WO_4)_3$ (FIG. 24)
Mixtures of $MnMoO_4$—$ZnMoO_4$ (FIG. 25)
Mixtures of $Fe_2TiO_4$—$Fe_3O_4$ (FIG. 26)
Mixtures of $Ca_3Cr_2Si_3O_{12}$—$Ca_3Fe_2Si_3O_{12}$ (FIG. 27)
Mixtures of $65MgSiO_3/35FeSiO_3$—$CaSiO_3$ (FIG. 28)
Mixtures of $LiAl_5O_8$—$LiFe_5O_8$ (FIG. 29)
Mixtures of $NaAlSi_3O_8$—$KAlSi_3O_8$ (FIG. 30)

In addition to these group of materials, the following mixture is to be listed:

Mixtures of $Na_2O$—$B_2O_3$—$SiO_2$

Figure 45:
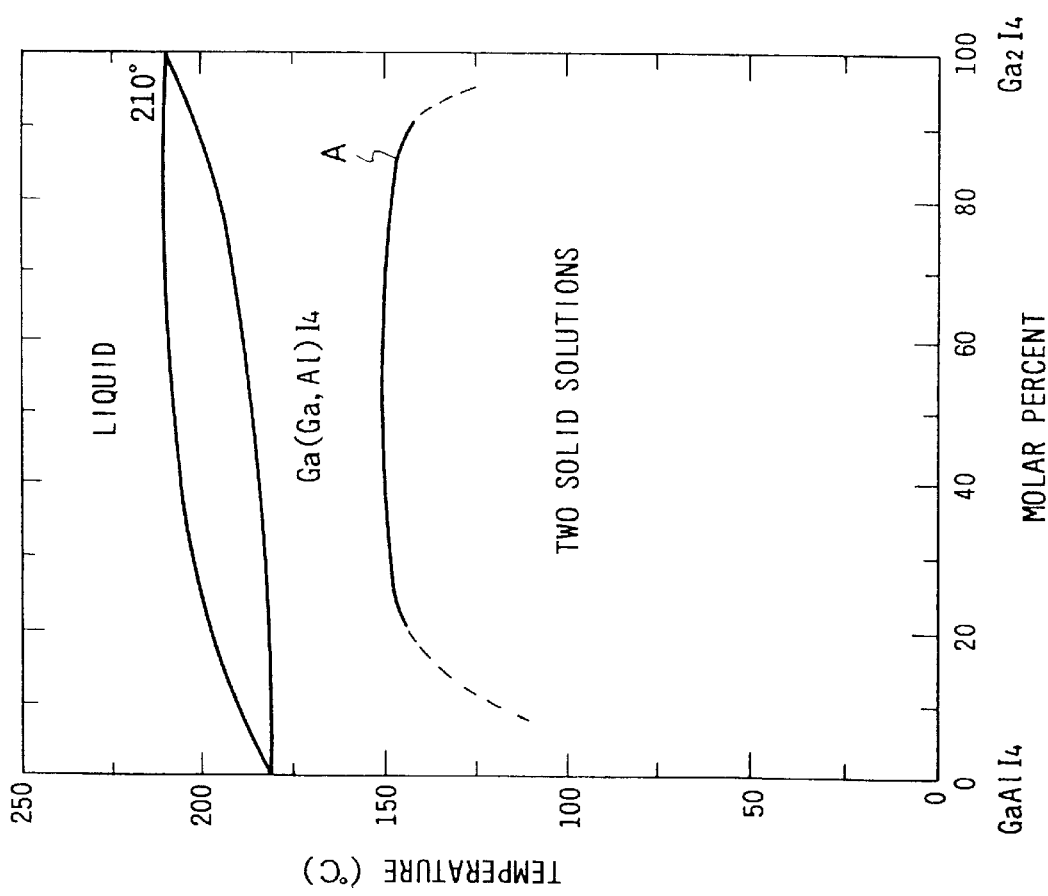

In addition, the following materials containing halogenide—halogenide mixtures which have been ascertained to cause the phase separation from the miscibility gap line (A) given in the phase diagrams presented in FIG. 31 through FIG. 45 can be listed as such materials:

Mixtures of LiCl—NaCl (FIG. 31)
Mixtures of KCl—NaCl (FIG. 32)
Mixtures of CsCl—TlCl (FIG. 33)
Mixtures of $CaCl_2$—$MnCl_2$ (FIG. 34)
Mixtures of $CaCl_2$—$SrCl_2$ (FIG. 35)
Mixtures of LiBr—AgBr (FIG. 36)
Mixtures of AgBr—NaBr (FIG. 37)
Mixtures of KBr—NaBr (FIG. 38)
Mixtures of TlBr—CsBr (FIG. 39)
Mixtures of KI—NaI (FIG. 40)
Mixtures of NaI—$CaI_2$ (FIG. 41)
Mixtures of $(GaI_2)_2$—$NaGaI_4$ (FIG. 42)
Mixtures of $(GaI_2)_2$—$KGaI_4$ (FIG. 43)
Mixtures of $(GaI_2)_2$—$RbGaI_4$ (FIG. 44)
Mixtures of $GaAlI_4$—$Ga_2I_4$ (FIG. 45)

Also, as materials causing the binodal decomposition or the spinodal decomposition mentioned above, it is possible to list the non-stoichiometric compounds of oxides, halogenides, and so forth.

Here, the term "non-stoichiometric compounds" means those compounds which are composed of the element M and the element X and yet have their composition deviating from the standard ratios, and, in the case of those non-stoichiometric compounds in which the element M and the element X are compounded in the ratio of (m-δ) versus n (wherein, m and n express positive integral numbers while δ expresses a number which satisfies the relation, 0<δ<1), δ represents the extent of the deviation from the standard ratios of composition and is accordingly called the "non-stoichiometric ratios". Such a deviation from the standard ratios of composition occurs in consequence of a lattice defect present in either the element M or the element X. In case the lattice defect is in the form of a void lattice, for example, in the element, attraction works between void lattices, and this is one factor accountable for the fact that such a non-stoichiometric compound assumes properties different from those of the regular stoichiometric compound.

Then, in such a non-stoichiometric compound, the element M and the element X, which constitute the compound, can be regarded as forming a mixture consisting of the two constituents, and such compounds cause the binodal decomposition or the spinodal decomposition in the same way as the recording materials mentioned above. That is to say, such non-stoichiometric compounds cause the occurrence of the binodal decomposition or the spinodal decomposition by the effect of a change in temperature and undergo their phase separation between the phase with more void lattice points and the phase with less of such lattice points (that is to say, between two phases with differences in their non-stoichiometric ratios).

To the formation of such stoichiometric compounds, it is possible to apply any compound formed of at least one of the metal elements as selected out of the following list:

Beryllium (Be), Boron (B), Magnesium (Mg), Aluminium (Al), Silicon (Si), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germaium (Ge), Arsenic (As), Selenium (Se), Rubidium (Rb), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Hafnium (Hf), Tantalum (Ta), Tungsten (W), Rhenium (Re), Osmium (Os), Iridium (Ir), Platinum (Pt), Gold (Au), Thallium (Tl), Lead (Pb), Bismuth (Bi), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu), and Uranium (U)

and at least one element selected out of the following: Oxygen (O), Sulfur (S), Nitrogen (N), Hydrogen (H), Iodine (I), Bromine (Br), and Chlorine (Cl).

Moreover, such inorganic materials which show a monotonous curve with a convex upward contour in relation to temperature as observed in the phase diagram usually have the miscibility gap mentioned above and can be applied as recording material for the present invention.

Figure 46:
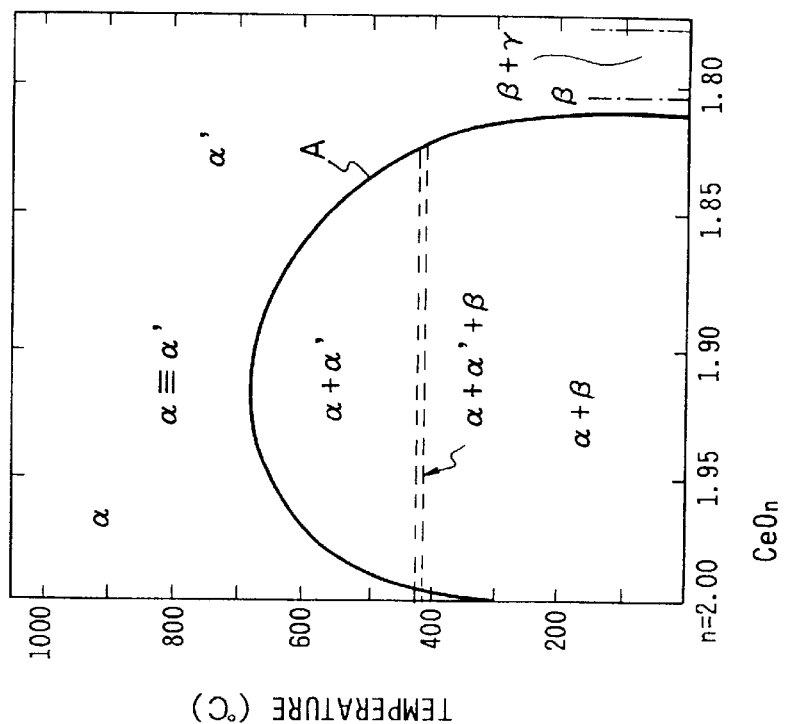
Figure 48:
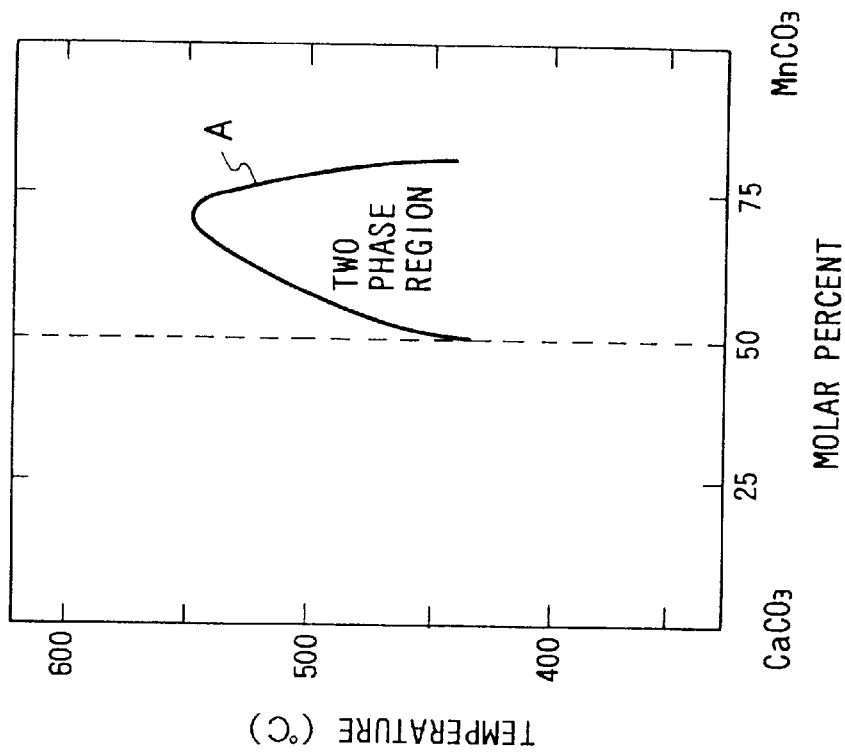
Figure 47:
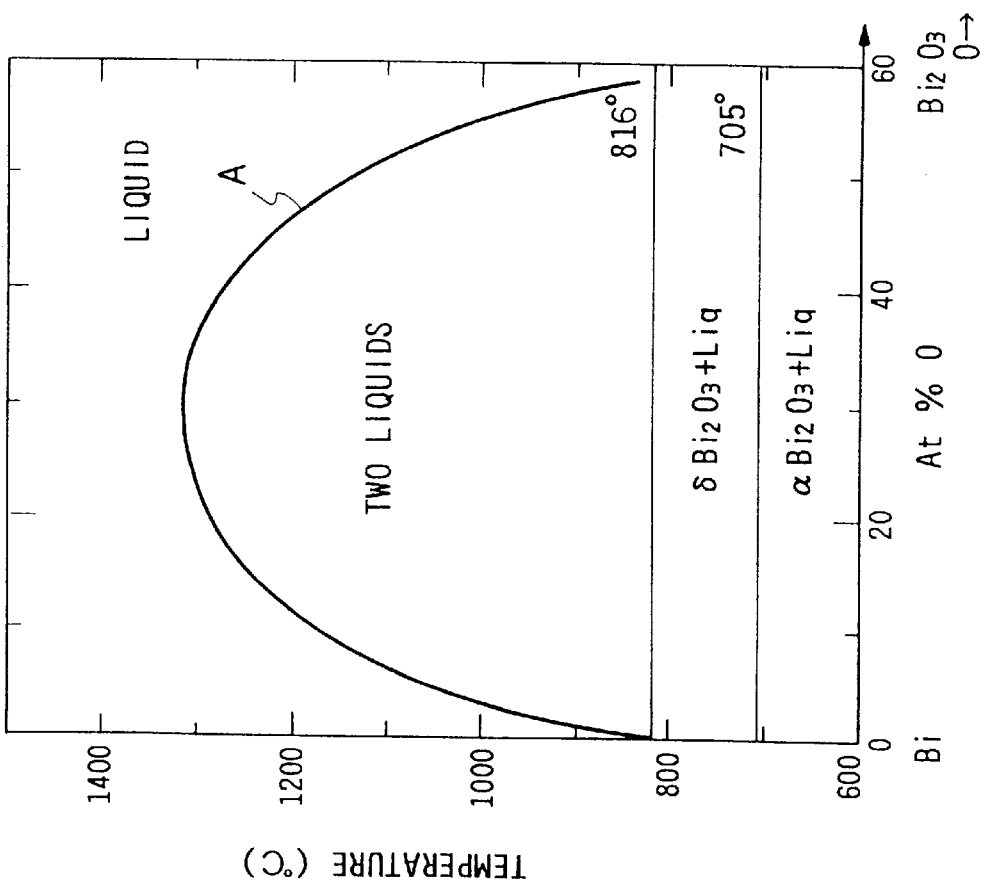
Figure 49:
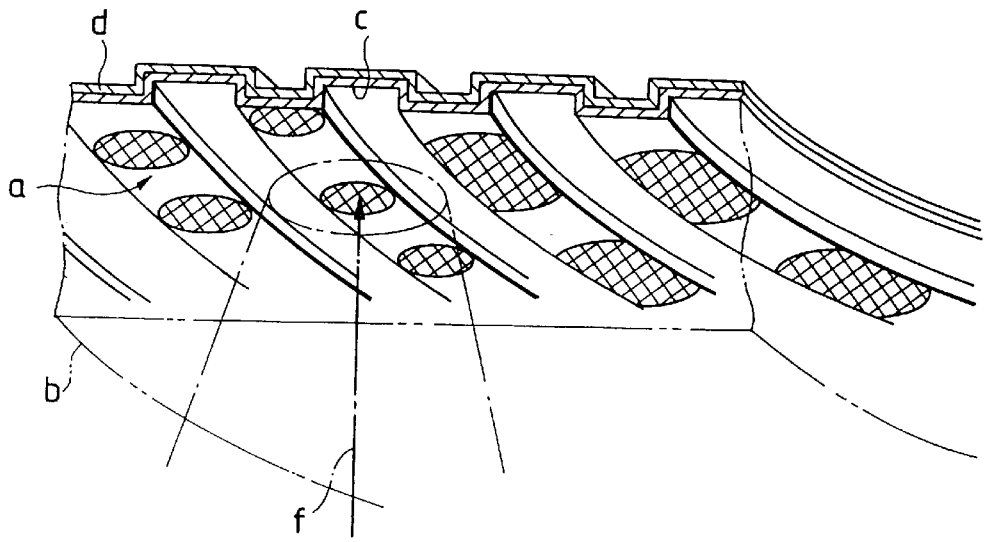
FIG. 49 is partial perspective view of the optical recording medium used for the conventional optical recording process.
Figure 50:
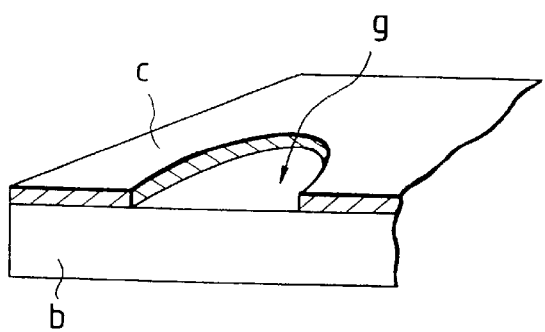
FIG. 50 through FIG. 52 are partial enlarged view of what is shown in FIG. 39.
Figure 51:
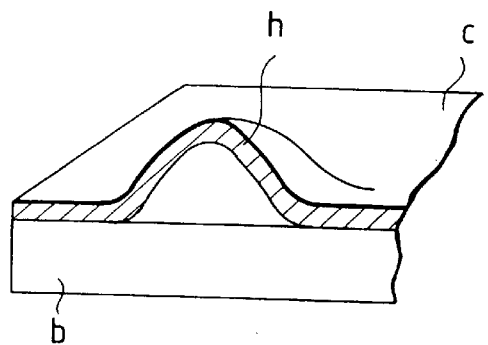
Figure 52:
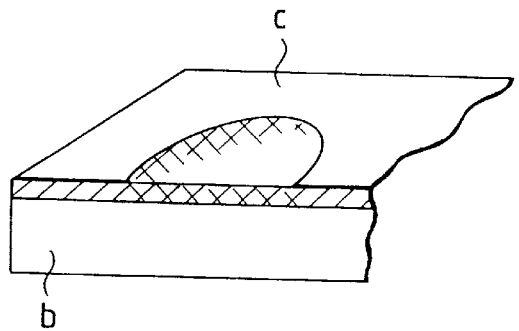
Figure 53:
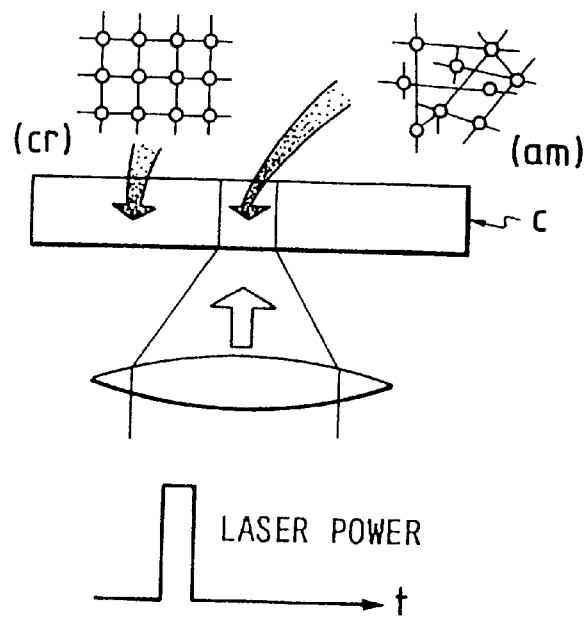
FIG. 53 through FIG. 55 illustrate the principles of recording, reproduction, and erasure by the "phase change process"
Figure 54:
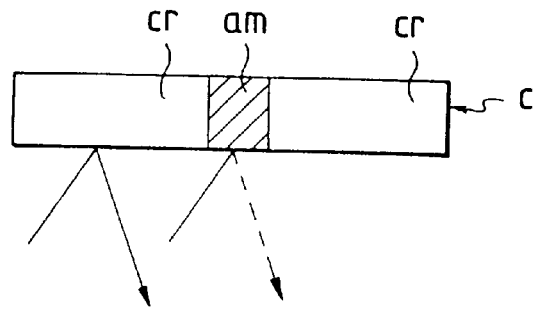
Figure 55:
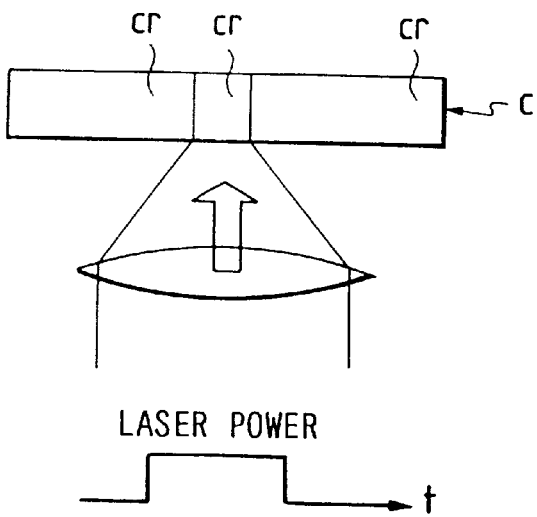
Figure 56:
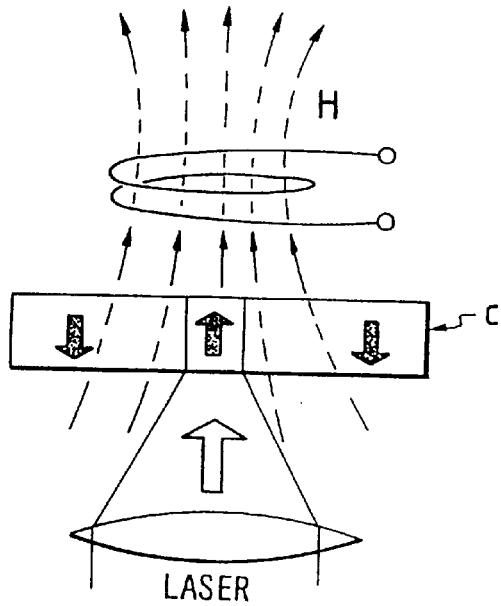
FIG. 56 through FIG. 58 illustrate the principles of recording, reproduction, and erasure by the "magneto-optical process".
Figure 57:
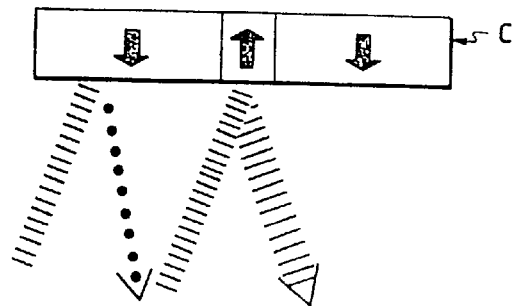
Figure 58:
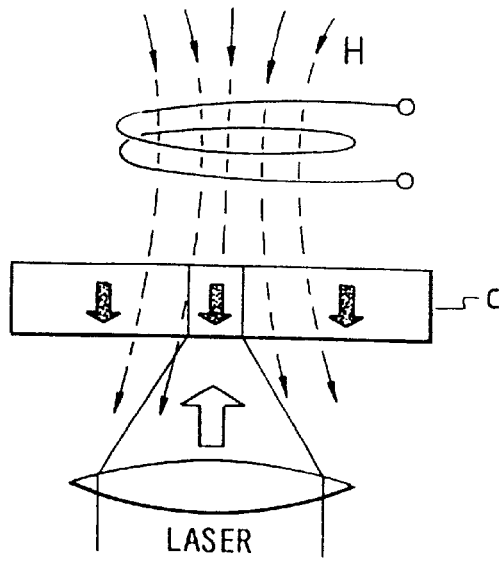

Then, as specific examples of the non-stoichiometric compounds and inorganic materials mentioned above, it is possible to list such recording material groups as the following material groups which have been ascertained to cause the phase separation in light of the miscibility gap line (A) in the phase diagrams presented in FIG. 46 through FIG. 48:

$CeO_n$ group (FIG. 46)
Mixtures of Bi—$Bi_3O_3$ (FIG. 47)
Mixtures of $CaCO_3$—$MnCO_3$ (FIG. 48)

Moreover, as organic materials applicable as the recording materials mentioned above, there are polymer blends called "polymer alloys", which cause the occurrence of the binodal decomposition or the spinodal decomposition, and random copolymers, alternate copolymers, block copolymers, graft copolymers, and stoichiometric high molecular compounds, which cause a micro phase separation.

Then, a description is made of a case to which an inorganic recording material is applied. The inorganic material mentioned above which causes the binodal decomposition or the spinodal decomposition is coated in the form of a film on the substrate and this film is conditioned to assume a single crystalline state or amorphous state, and this conditioned recording film is then irradiated with a beam of light or heat to achieve a phase separation thereof, and, with a change made in the reflection factor in this region, information is written to the film, so that the film is offered for use as an optical recording medium for use exclusively for recording and reproduction, or, with a beam of light or heat being irradiated on the region where the phase separation is thus achieved, the irradiated region is caused to undergo dissolution, and, by restoring this dissolved region to its initial state, the film is offered for use as an optical recording medium for use in recording, reproduction, and erasure.

Moreover, in case an inorganic recording material which has a miscibility gap appearing in its liquid phase region is applied, or in case an inorganic recording material which has a miscibility gap appearing in its solid phase region is used and yet the irradiating condition of the laser beam or the like is set at a temperature above the level of its liquid phase region, it is possible to apply the information rewriting system with one beam as described above.

On the other hand, in the case to which an organic recording material is applied, which is described in the following, the organic material which causes the binodal decomposition or the spinodal decomposition or a micro phase separation is coated in the form of a film on the substrate and conditioned to the state of a single phase, and, with a beam of light or heat irradiated on the recording film as so conditioned, the film is caused to have selective phase separation, and, with information written to the film through utilization of the changes in the reflection factor in this irradiated region, the recorded film thus processed is offered for use as an optical recording medium exclusively in recording and reproduction, or, with the beam of light or heat or the like being irradiated on this region where the phase separation has thus been produced, the irradiated region of the film is caused to undergo its dissolution, thereby being restored to its initial state, and the film so prepared is offered for use as an optical recording medium for recording, reproduction, and erasure.

At this juncture, the materials for the substrate which is used for the formation of the recording film mentioned above are glass and such light-transmissive resin materials as acrylic resin, polycarbonate, and epoxy resin for the type of process in which a beam of light is irradiated from the substrate side. On the other hand, such metal materials as aluminum can be used in the type of process in which a beam of light is irradiated from the side opposite to the substrate. Moreover, in case resin material is used for the substrate, it is feasible to set up a heat interfering layer composed, for example, of $SiO_2$, $ZrO_3$, and ZnS between the substrate and the recording film in order to thereby prevent the thermal damages of the substrate. Above all, if a heat interfering layer made of $SiO_3$ or the like and having heat radiating effect is installed in a position adjacent to the recording film, it is possible to give high temperature heating and quenching treatments to the recording film and consequently it is made possible to apply the present invention which utilizes the phase separation attending the spinodal decomposition as the means of recording the information.

Furthermore, a protective film layer composed of the material forming the above-mentioned heat interfering layer or any such materials as resin hardened by the ultraviolet rays, acrylic resin, polycarbonate, and epoxy resin may be coated over the recording film for the purpose of protecting its surface. In addition, a highly refractive layer made of ZnS or the like may be formed on the surface of the recording film for the purpose of increasing the quantity of light to be reflected from the recording film mentioned above.

Next, as regards the means of coating on the substrate the recording film composed of inorganic material having such properties as cause the binodal decomposition or the spinodal decomposition, it is possible to apply such processes as the thermal vaporization process, the ion plating process, the reactive sputtering process, the chemical vapor phase deposition process (CVD), the ion-aided deposition process (IAD), and the molecular beam epitaxial process (MBE). On the other hand, as regards the means of coating on the substrate the recording film composed of organic material having such properties as cause the occurrence of the binodal decomposition, the spinodal decomposition, or the micro phase separation, it is feasible to form the film by having the copolymers or the like perform their polymerizing reaction directly on the substrate or to dissolve such copolymers into their secondary compound and to coat the compound on the substrate by some appropriate means.

In this regard, the technical means of accomplishing this is applied to the recording, reproducing, and erasing type of the recording film since it is capable of rewriting the recorded information. Yet, in view of the favorable stability in the maintenance of the recorded information, the means according to the present invention can, of course, be applied also to the recording and reproducing type of the recording film, as described above.

According to the present invention, the recording film is caused to undergo the phase separation by such means as light and heat, so that the optical properties in the processed region are changed. Therefore, the recording film is not liable to the occurrence of changes in the said recording film with the passage of time, and it is consequently capable of maintaining the state of its phase separation over a long period of time.

In the meantime, according to the present invention, the recording film is formed of such recording material as has a miscibility gap line appearing in its liquid phase region as observed in the phase diagram and the recording film also performs the rewriting of information with a single recording-erasing beam with selectively changeable output, which is irradiated on the surface of the above-mentioned recording film, so that the present invention attains simplification in the rewriting operation.

Furthermore, according to the present invention, a heat interfering film has a heat radiating effect and is positioned in the region adjacent to the recording film and causes the recording film to have its phase separation attending the spinodal decomposition by the high temperature heating and quenching treatments applied to the recording film. Therefore, the present invention achieves a reduction of the time required for the phase separation.

At this junction, the inventors of the present invention have advantage of the maintenance of the state of phase separation in the recording films according to the present invention over a long period of time is to be found in the points mentioned in the following. Specifically, if the region of the recording film where the phase separation has occurred is to resume its original state, it is necessary for the considerably large number of atoms to attain their diffusion over a considerable distance. However, for the recording film which is in the state of its solid phase at least under the room temperature, the speed of diffusion of the atoms of which this recording film is composed is extremely low and also that the their diffusion does not occur in their groups. It is primarily conceivable that these factors are accountable for the point that the recording film mentioned above is not readily liable to undergo its change with a time being elasped.

Also, in light of the fact that secular changes occur in the phase change type recording material by the effect of minute fluctuations in the arrangement among the adjacent atoms in it, it is possible to infer that the recording film according to the present invention is not liable to change in it along with the passage of time.

Referring to the drawings, preferred embodiments of the present invention will now be described with reference to the accompanying drawings.

FIRST EXAMPLE

Figure 1:
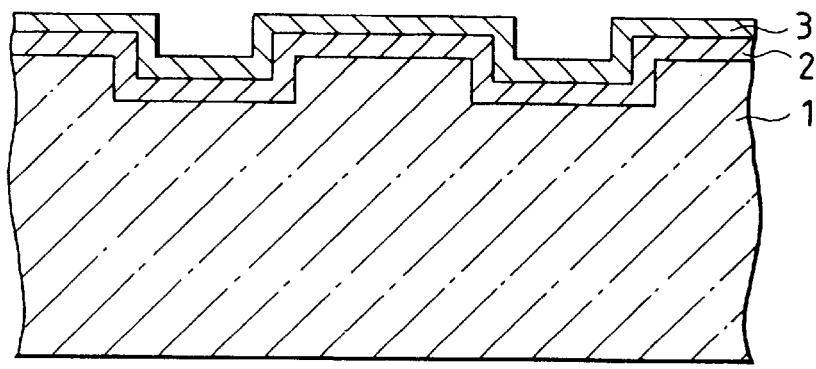
FIG. 1 through FIG. 5 illustrate the examples of preferred embodiments of the present invention.

Now, the optical recording medium used in this first example of preferred embodiments has its principal parts constructed, as shown in FIG. 1, with a heat-resistant plastic (polycarbonate) substrate (1) with a thickness of 1.2 mm and a diameter of 5¼ inches (ISO standard), a heat interfering layer (2) made of $SiO_2$ in the thickness of 1000 Å and coated on the surface of the substrate (1), and a recording film (3) made of a mixture of $LiO_2$ and $SiO_2$ formed on the surface of this heat interfering layer (2).

In this regard, the recording film (3) is coated on the heat interfering layer (2) on the substrate (1) by depositing a mixture of $(LiO_2)_{25}$ and $(SiO_2)_{75}$ thereon by applying the sputtering process using two targets $LiO_2$ and $SiO_2$ and by conditioning the formed film to the crystalline state in a single phase.

Figure 2:
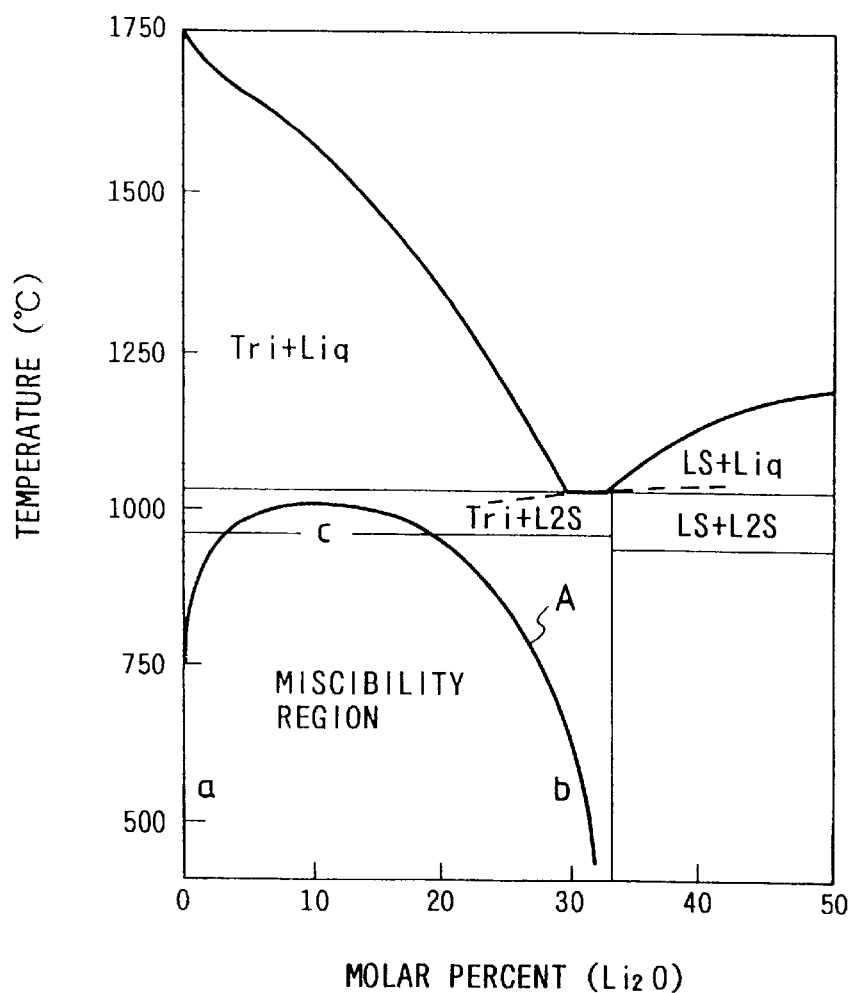
Figure 3:
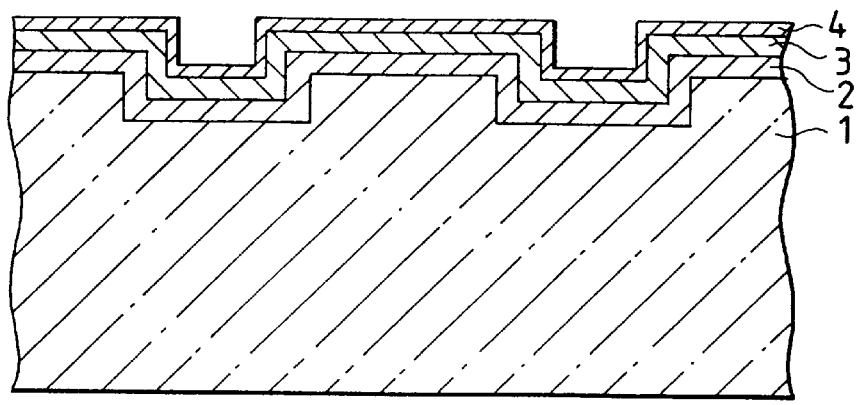

Then, the optical recording medium is rotated at 1,800 rpm, and, while the said medium is kept in this state, a laser beam with the output of 10 mW and at the frequency of 3.7 MHz is irradiated onto the recording region of the recording film (3), and, with the temperature in the irradiated region of the recording film (3) being set at the temperature for the miscibility region as shown in the phase diagram given in FIG. 2, the binodal decomposition is caused to occur in the partial region of the recording film, so that the film undergoes its selective phase separation in the said region, and information is written to the region by the effect of the changes in the reflection factor in the region.

In the meanwhile, the optical recording medium mentioned above is rotated at 1,800 rpm, and, in this state, a laser beam with the output of 1 mW is irradiated onto the recording film (3), and the reflected beam thereof is read by the light receiving element, and the reproduction of the information is thereby performed. The C/N ratio of the reproduced signal was 50 dB.

Moreover, this optical recording medium has been applied as a recording medium for its use exclusively in recording and reproduction.

SECOND EXAMPLE

The optical recording process as described in this example of preferred embodiments is approximately the same as in the optical recording process shown in the first example of the preferred embodiments, except for the point that this process uses an optical recording medium which is provided additionally with a layer (4) with a high index of refraction, being made of ZnS, a material with a high index of refraction, over the recording film (3) mentioned above.

Therefore, this example not only has the same advantage as those of the first example of preferred embodiments, but also offers the additional advantage that it achieves an improvement on the C/N ratio of the reproduced signals to 53 dB (whereas the C/N ratio is 50 dB in the first example) because it can secure an increased quantity of light from the recording film (3) owing to the effect of the layer (4) with a high index of refraction mentioned above.

THIRD EXAMPLES

Figure 4:
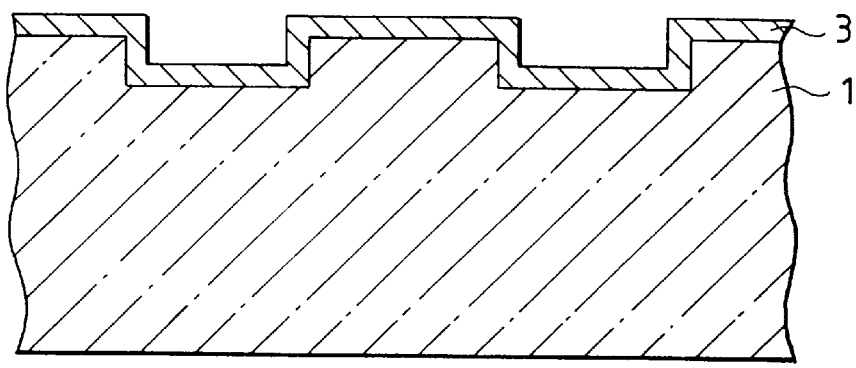

The optical recording process described in this example of preferred embodiments is approximately the same as the process described in the first example, except for the point that the recording film (3) of the optical recording medium (Refer to FIG. 4) used in this process is composed of $TeO_x$, which is a non-stoichiometric compound, and the point that this recording film (3) is formed directly on the substrate (1).

Here, the recording film (3) mentioned above is prepared by coating $TeO_x$ on the substrate (1) by the RF ion plating process using the Te target in the state in the atmosphere of oxygen gas and by conditioning the film to assume a crystalline state in a single phase.

In this regard, the mark x as used in $TeO_x$ given above has shown the value, x=1.75.

Moreover, the conditions for setting the RF ion plating process are as mentioned in the following:
Target vaporizing process:
  Resistance heating
  Electron beam vaproization
Atmosphere:
  Ar pressure . . . $1 \times 10^{-2}$ to 1 Pa
  $O_2$ pressure . . . $1 \times 10^{-2}$ to 1 Pa
RF power:
  100 to 1,000 KW
Rate:
  0.5 to 10 Å/sec.

Moreover, for the operation for writing information to the optical recording medium mentioned above, the optical recording medium is rotated at 1,800 rpm, and, in this state, a laser beam with the output of 6 mW at the frequency of 3.7 MHz is irradiated onto the recording region of the recording film (3), and, after the recording film (3) in the irradiated region is once dissolved, it is cooled down to cause the binodal decomposition, so that the processed region of the film has a selective phase separation, and the writing of information to the recording medium is thus performed.

On the other hand, this process performs the reproduction of the recorded information by rotation the above-mentioned optical recording medium at 1,800 rpm and irradiating, while the said medium is kept in this state, a laser beam with the output of 1 mW is irradiated onto the recording film (3) of the said medium and reading the reflected light of the said beam by means of the light receiving element. The C/N ratio of the reproduced signal is 55 dB.

Moreover, the fact that the recording film (3) formed of $TeO_x$ has the phase separation occurring in it has been ascertained on the basis of the observation that the structure in the irradiated region as viewed in the TEM photograph (a photograph taken under a transmissive type electronic microscope) is in the structure peculiar to the binodal decomposition.

Then, the optical recording process as described in this example of preferred embodiments has an excellent advantage in the stability for the maintenance of the recorded information, and, above all, it attains a C/N ratio in the reproduced signals at the level of 55 dB, as mentioned above. Thus, the process in this example has proved to be superior to the process described in the second example of preferred embodiments (The process in the second example recorded a C/N ratio at 53 dB).

Moreover, this optical recording medium is applied to its use exclusively for recording and reproduction.

FOURTH EXAMPLE

Figure 5:
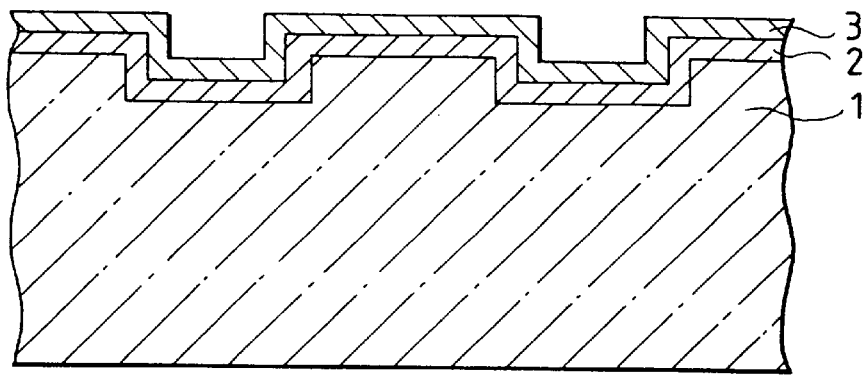

The optical recording process described in this example of preferred embodiments is almost the same as the recording process described in the third example of preferred embodiments, except for the point that this process is provided with a heat interfering layer (2) made of SiO$_2$ on its substrate, as shown in FIG. 5, and the point that it uses an optical recording medium with a recording film (3) made of TeO$_x$ coated on the surface of this heat interfering layer (2). That is to say, the optical recording medium of which the recording film (3) mentioned above is conditioned to assume a crystalline state in a single phase is rotated at 1,800 rpm, and, while the recording film is kept in this state, a laser beam with the output of 10 mW and at the frequency of 3.7 MHz is irradiated onto the recording region of the recording film (3), so that the recording film (3) in the irradiated region is once dissolved and thereafter cooled to cause a selective phase separation therein, and information is thus written to the recording film.

Moreover, this optical recording medium is applied to its use exclusively in recording and reproduction in the same way as in the third example of preferred embodiments.

Now, in this example, the output from the beam in the writing process is as high as 10 mW for the operation in which information is written by the irradiation of the laser beam onto the surface of the recording film (3) of the optical recording medium mentioned above, and, unlike the optical recording medium described in the third example, the medium in this example is provided with a heat interfering layer (2), and, by the heat radiating effect of this heat interfering layer (2), the temperature in the recording film in the irradiating region is cooled more sharply than in the case of the third example of preferred embodiments. Consequently, not the binodal decomposition but the spinodal decomposition occurs in the irradiated region of the recording film in this example.

Therefore, in contrast with the optical recording process in the third example, which is performed through utilization of the feature that the reflection factor in the region where the binodal decomposition has occurred becomes lower than in the other region, the optical recording process in this example is performed through utilization of the feature that the reflection factor in the region where the spinodal decomposition has occurred will be higher than in the other region.

Than, also the optical recording process described in this example of preferred embodiments offers the advantage that it has excellent stability for the maintenance of recorded information as is the case with the processes in the other examples, and, in addition, this process has recorded 50 dB in the C/N ratio of the reproduced signal, thus marking a value higher than that achieved in the existing process.

Furthermore, the optical recording process described in this example performs the recording of information through utilization of the phase separation attending the spinodal decomposition and consequently offers the additional advantage that it can operate at a higher writing speed than in the process described in the third example.

FIFTH EXAMPLE

The optical recording process described in this example is almost the same as the process in the fourth example, except for the point that this process applies the optical recording medium described in the fourth example and the point that this process performs the rewriting of information with one beam through its utilization of the phase separation between the spinodal decomposition and the binodal decomposition in the recording film (3). In this case, moreover, the phase separation attending the spinodal decomposition is set in correspondence with the recording state while the phase separation attending the binodal decomposition is set in correspondence with the erasing state. That is to say, the optical recording medium in which the recording film (3) is conditioned to assume a crystalline state in a single phase is rotated at 1,800 rpm, and, while the said medium is held in this state, a laser beam with the output of 8 mW and at the frequency of 3.7 MHz is irradiated uniformly over the surface of the recording film (3) mentioned above and the recording film (3) is thereby dissolved once. Then, the said recording film (3) is gradually cooled, by which a phase separation attending the binodal decomposition is elicited uniformly in the recording film (3), and its initialization is thereby effected.

Next, with the initialized optical recording medium being rotated at 1,800 rpm, and, while the medium is kept in this state, a laser beam with the output of 10 mW and at the frequency of 3.7 MHz is irradiated onto the recording region on the recording film (3) mentioned above, and the recording film (3) in the irradiated region is thereby dissolved once and thereafter cooled sharply, by which the said recording film is caused to have a phase separation attending the spinodal decomposition, and the writing of information is performed in this state of the film.

In the meantime, the optical recording medium to which information has been thus written is rotated at 1,800 rpm, and, while the said medium is kept in this state, a laser beam with the output of 1 mW is irradiated onto the recording film (3) of the said medium and also the reflected beam is read by the light receiving element, the reproduction of the recorded signal being thereby performed. Moreover, the C/N ratio of the reproduced signal is almost the same as that recorded in the fourth example of preferred embodiments.

Moreover, for the rewriting of the information written to the optical recording medium mentioned above, this optical recording medium is rotated at 1,800 rpm, and, while the said medium is kept in this state, a single recording-erasing laser beam (with the output of 10 mW for recording, with the output of 8 mW for erasing, and at the frequency of 3.7 MHz) which can be selectively switched for different output levels is irradiated onto the said recording film, by which the rewriting of the recorded information is performed.

Moreover, also the optical recording process described in this example of preferred embodiments has the excellent feature in respect of the stability for the maintenance of the recorded signal in the same way as in the processes in the other examples of preferred embodiments, and this process recorded a high value also for the C/N ratio of the reproduced signal as compared with the value attained by the existing process.

Furthermore, the optical recording process described in this example of preferred embodiments performs the writing and rewriting of information by one beam using the phase separation between the spinodal decomposition and the binodal decomposition, and this process therefore offers the advantage that it is capable of rewriting the recorded information and that it can perform this with simpler operation as compared with the case of the processes described in the other examples.

SIXTH EXAMPLE

The optical recording process described in this example of preferred embodiments is almost the same as the process in the first example of preferred embodiments, except for the point that the recording film for the optical recording medium used in this process is composed of tri-block copolymer coated directly on the substrate and causes the occurrence of the micro phase separation.

Here, the recording film mentioned above is formed directly into a film by the living copolymerizing process of a tri-block copolymer in the structure, (polystyrene)-(polyisoprene)-(polystyrene), and is conditioned to be in the single phase state. Here, instead of this film-forming process, it is also feasible to form a recording film set in the state of a single phase by once dissolving the tri-block copolymer mentioned above into such a solvent as alcohol and applying the solution by spin coating to the surface of the substrate and thereafter forming a recording film set in the state of a single phase by evaporating the above-mentioned solvent, such as alcohol.

Then, the operation for the writing of information to the optical recording medium mentioned above is performed by rotating the optical recording medium at 1,800 rpm and, while keeping the said medium in this state, irradiating the recording region of the recording film with a laser beam with the output of 7 mW and at the frequency of 3.7 MHz, and once dissolving the recording film in the irradiated region and thereafter cooling the film, thereby selectively causing a micro phase separation to occur in the film.

On the other hand, the reproduction of the recorded information is performed by rotating the optical recording medium mentioned above at 1,800 rpm and irradiating a laser beam with the output of 0.8 mW to the recording film (3) of the said recording medium, while the said recording medium is kept in this state, and causing the light receiving element to read the reflected light of this beam.

Moreover, this optical recording medium has been applied as a recording medium for its use exclusively in the recording and reproduction of information.

Then, also this optical recording process described in this example of preferred embodiments has the advantage that it is excellent in the stability for the maintenance of the recorded information, and this process has also proved to produce a favorable C/N ratio of the reproduced signal.

SEVENTH EXAMPLES

The optical recording process described in this example is almost the same as the process described in the fifth example, except for the point that the optical recording medium used in this process is composed of a blend of the following polymers which are placed to form a coat of film on the substrate and cause the spinodal decomposition and the binodal decomposition, depending on the cooling condition applied to them. In this case, moreover, the phase separation attending the binodal decomposition is set in correspondence with the recording state while the phase separation attending the spinodal decomposition is set in correspondence with the erasing state.

At this juncture, the recording film mentioned above has been formed into a film by coating the polymer blend of (polystyrene)-(polyisoprene) dissolved in acetone on the substrate and conditioning the film to assume the sate of a single phase.

That is to say, with the recording film (3) as adjusted to the state of a single phase is rotated at 1,800 rpm, and a laser beam with the output of 8 mW and at the frequency of 3.7 MHz is irradiated uniformly over the surface of the recording film (3) mentioned above, the said recording film being thereby once dissolved, and thereafter the film is quenched and thereby caused to undergo a uniform phase separation attending the spinodal decomposition, and the initialization of the recording film (3) is thus effected.

Next, the initialized optical recording medium is rotated at 1,800 rpm, and, while the said medium is kept in this state, a laser beam with the output of 6 mW and at the frequency of 3.7 MHz is irradiated onto the recording region of the recording film (3) mentioned above, thereby once dissolving the recording film (3) in the irradiated region. Thereafter, the said region is gradually cooled, which causes a phase separation attending the binodal decomposition, and the writing of information is thus performed.

In the meantime, the optical recording medium containing the information written to it is rotated at 1,800 rpm, and, with the said medium kept in this state, a laser beam with the output of 0.8 mW is irradiated on the recording film (3) of the said medium and also the reflected beam is read with the light receiving element, and the reproduction of the recorded information is thus performed.

Moreover, in case the information written to the optical recording medium mentioned above is to be rewritten, the optical recording medium is rotated at 1,800 rpm, and, while this recording medium is kept in this state, the rewriting of the recorded information is performed by irradiating a single erasing beam (with the output of 6 mW for recording, with the output of 8 mW for erasing, and at the frequency of 3.7 MHz), which can be switched selectively for generating variable output, onto the recording film of the said recording medium.

Then, also this optical recording process described in this example of preferred embodiments has the advantage that it has excellent stability for the maintenance of the recorded information, in the same way as in the case of the other examples of preferred embodiments, and this process also attains a high value in respect of the C/N value of the reproduced signal in comparison with the value recorded by the existing process.

Furthermore, also the optical recording process described in this example of preferred embodiments performs the writing and rewriting of information through utilization of the phase separation between the spinodal decomposition and the binodal decomposition in the same manner as in the fifth example of preferred embodiments, and this process, therefore, offers the advantage that it is capable of performing the rewriting of the information and also offers simplicity and convenience in its operation, as compared with the processes described in the other examples of preferred embodiments.

According to the present invention, the recording film to undergo its selective phase separation by applying such means as light and heat, thereby producing changes in the optical properties of the processed region. Therefore, the recording film mentioned above is not liable to the occurrence of changes in its state along with the passage of time, by which it becomes possible to maintain the state of the phase separation over a long period of time and is consequently capable of securing the effect of maintaining the recorded information for a long time.

Further, according to the present invention, a recording film of such material that its miscibility gap line appears in its liquid phase region as seen in the phase diagram and performs the rewriting of the recorded information with one beam by irradiating a single record-erasing beam the output of which can be changed selectively. Therefore, this process offers the advantage that the rewriting operation is thereby simplified.

Furthermore, the present invention provides a heat interfering layer having a heat radiating effect in a position adjacent to the recording film and causes the recording film to undergo its phase separation attending its spinodal decomposition by applying high temperature heating and quenching treatments to the recording film. Thus, this process achieves a reduction in the duration of time required for the phase separation and can therefore accomplish the advantageous effect that it improves the rewriting speed.

What is claimed is:

1. A method for recording information to a recording medium comprising:

a substrate having a surface; and a recording film formed on said surface, said recording film having optical properties that change in response to the application of a light beam or heat to a portion of said recording film and subsequent cooling of said recording film, said recording film is in a single phase state before recording and the portion of the recording film exposed to a light beam or heat undergoes selective phase separation, wherein said recording film comprises a non-stoichiometric inorganic compound, wherein said inorganic compound comprises:

at least one element selected from the group consisting of Be, B, Mg, Al, Si, Sc, Ti, V, Cr, Mn, Fe, Co, Ni, Cu, Zn, Ga, Ge, As, Se, Rb, Y, Zr, Nb, Mo, Tc, Cd, In, Sn, Sb, Te, Hf, Ta, W, Re, Tl, Pb, Bi, Ce, Pr, Nd, Pm, Sm, Eu, Gd, Tb, Dy, Ho, Er, Tm, Yb, Lu, and U; and at least one element selected from the group consisting of O, S, N, H, I, Br, and Cl;

said method comprising the steps of:

applying at least one of a light beam and heat onto said recording film in a single phase state; and cooling said recording film to cause a selective phase separation in a portion of said recording film to which at least one of said light beam and said heat is applied;

wherein said selective phase separation is caused by a binodal and/or spinodal decomposition;

wherein said binodal decomposition results from the application of said light beam or said heat and subsequent gradual cooling; and wherein said spinodal decomposition results from the application of said light beam or said heat and subsequent quenching treatment; and wherein information is recorded making use of the difference between the reflectivity of the single phase state and the phase separation state.

2. A method for recording information to a recording medium as claimed in claim 1, wherein a temperature of said heating higher than a temperature of a miscibility gap line observed in a phase diagram is applied to said recording film.

3. The method for recording information in a recording medium as claimed in claim 1, wherein said recording film is made of a recording material having a miscibility gap line appearing in a solid phase observed in a phase diagram.

4. The method for recording information in a recording medium as claimed in claim 1, wherein said recording film is made of a recording material having a miscibility gap line appearing in a liquid phase observed in a phase diagram.

5. The method for recording information in a recording medium as claimed in claim 1, wherein said recording film is composed of elements which are compounded in a ratio of $(m-\delta)$ to n in which m and n express positive numbers while $\delta$ expresses a number which satisfies a relation, $0<\delta<1$.

6. A method for recording information to a recording medium comprising:

a substrate having a surface; and a recording film formed on said surface, said recording film having optical properties that change in response to the application of a light beam or heat to a portion of said recording film and subsequent cooling of said recording film, said recording film is in a single phase state before recording and the portion of the recording film exposed to a light beam or heat undergoes selective phase separation, wherein said recording film comprises a non-stoichiometric inorganic compound, wherein said inorganic compound comprises:

at least one element selected from the group consisting of Be, B, Mg, Al, Si, Sc, Ti, V, Cr, Mn, Fe, Co, Ni, Cu, Zn, Ga, Ge, As, Se, Rb, Y, Zr, Nb, Mo, Tc, Cd, In, Sn, Sb, Te, Hf, Ta, W, Re, Tl, Pb, Bi, Ce, Pr, Nd, Pm, Sm, Eu, Gd, Tb, Dy, Ho, Er, Tm, Yb, Lu, and U; and at least one element selected from the group consisting of O, S, N, H, I, Br, and Cl;

said method comprising the steps of:

applying at least one of a light beam and heat onto said recording film in a single phase state; and cooling said recording film to cause a selective phase separation in a portion of said recording film to which at least one of said light beam and said heat is applied;

wherein said selective phase separation is caused by a binodal and/or spinodal decomposition;

wherein said binodal decomposition results from the application of said light beam or said heat, of a sufficient amount of melt said portion of said recording film, and subsequent gradual cooling; and wherein said spinodal decomposition results from the application of said light beam or said heat, of a sufficient amount to melt said portion of said recording film, and subsequent quenching treatment; and wherein information is recorded making use of the difference between the reflectively of the single phase state and the phase separation state.

\* \* \* \* \*

UNITED STATES PATENT AND TRADEMARK OFFICE
CERTIFICATE OF CORRECTION

PATENT NO. : 6,030,745            Page 1 of 1
DATED : February 29, 2000
INVENTOR(S) : Hironori Goto et al.

It is certified that error appears in the above-identified patent and that said Letters Patent is hereby corrected as shown below:

Title Page, Item [57], in the Abstract, line 5, after "beam", insert -- or --.

Claim 6, col. 20,
Line 55, "reflectively" should read -- reflectivity --.

Signed and Sealed this

Twelfth Day of June, 2001

*Attest:*

NICHOLAS P. GODICI
*Attesting Officer*    *Acting Director of the United States Patent and Trademark Office*